United States Patent
Byker et al.

(10) Patent No.: US 6,362,303 B1
(45) Date of Patent: Mar. 26, 2002

(54) THERMOSCATTERING MATERIALS AND DEVICES

(75) Inventors: Harlan J. Byker, Holland, MI (US); Frederick A. Millett, Perrysburg, OH (US); Paul H. Ogburn, Hudsonville, MI (US)

(73) Assignee: Pleotint, L.L.C., West Olive, MI (US)

( * ) Notice: Subject to any disclaimer, the term of this patent is extended or adjusted under 35 U.S.C. 154(b) by 0 days.

(21) Appl. No.: 09/574,625

(22) Filed: May 19, 2000

(51) Int. Cl.$^7$ .............................................. C08G 18/48
(52) U.S. Cl. ........................ 528/76; 528/83; 116/216; 116/217; 428/67; 428/913; 525/176; 525/440; 525/454; 525/458; 525/460; 525/931; 525/932
(58) Field of Search ................................. 525/176, 440, 525/454, 458, 460, 931, 932; 528/76, 83; 428/67, 913; 116/216, 217

(56) References Cited

U.S. PATENT DOCUMENTS

| | | |
|---|---|---|
| 4,260,225 A | 4/1981 | Walles |
| 4,268,413 A | 5/1981 | Dabisch |
| 4,425,161 A | 1/1984 | Shibahashi et al. |
| 4,435,047 A | 3/1984 | Fergason |
| 4,671,618 A | 6/1987 | Wu et al. |
| 4,673,255 A | 6/1987 | West et al. |
| 4,685,771 A | 8/1987 | West et al. |
| 4,688,900 A | 8/1987 | Doane et al. |
| 4,695,528 A | 9/1987 | Dabisch et al. |
| 4,734,359 A | 3/1988 | Oguchi et al. |
| 4,772,506 A | 9/1988 | Siol et al. |
| 4,815,826 A | 3/1989 | Fergason |
| 4,816,518 A | 3/1989 | Keskey et al. |
| 4,832,466 A | 5/1989 | Nishimura et al. |
| 4,838,660 A | 6/1989 | Fergason |
| 4,877,675 A | 10/1989 | Falicoff et al. |
| 4,888,126 A | 12/1989 | Mullen et al. |
| 4,900,135 A | 2/1990 | Yuasa et al. |
| 4,917,948 A | 4/1990 | Hotta |
| 4,952,035 A | 8/1990 | Yuasa et al. |
| 5,021,188 A | 6/1991 | Vaz et al. |
| 5,082,351 A | 1/1992 | Fergason |
| 5,087,387 A | 2/1992 | Mullen et al. |
| 5,089,904 A | 2/1992 | Fergason |
| 5,278,128 A | 1/1994 | Hotta et al. |
| 5,298,476 A | 3/1994 | Hotta et al. |
| 5,404,245 A | 4/1995 | Chahroudi |
| 5,426,009 A | 6/1995 | Coates et al. |
| 5,525,430 A | 6/1996 | Chahroudi |
| 5,530,566 A | 6/1996 | Kumar |
| 5,570,216 A | 10/1996 | Lu et al. |
| 5,589,237 A | 12/1996 | Akashi et al. |
| 5,615,040 A | 3/1997 | Watanabe |
| 5,644,330 A | 7/1997 | Catchpole et al. |
| 5,688,592 A | 11/1997 | Shibahashi et al. |
| 5,691,795 A | 11/1997 | Doane et al. |
| 5,695,682 A | 12/1997 | Doane et al. |
| 5,700,746 A | 12/1997 | Kutami et al. |
| 5,729,320 A | 3/1998 | Eidenschink et al. |
| 5,747,413 A | 5/1998 | Amano et al. |
| 5,780,387 A | 7/1998 | Harada |
| 5,847,798 A | 12/1998 | Yang et al. |
| 5,965,484 A | 10/1999 | Kohno et al. |

OTHER PUBLICATIONS

Beni, G. et al., "Electro–wetting displays," *Appl. Phys, Lett.*, vol. 38, No. 4, pp. 207–209 (02/81).

Beni, G. et al., "Anisotropic suspension display," *Appl. Phys. Lett.*, vol. 39, No. 3, pp. 195–197 (08/81).

Kroschwitz, J., "Miscibility," *Concise Encyclopedia of Polymer Science and Engineering*, pp. 629–632 (1990).

*Primary Examiner*—Rachel Gorr
(74) *Attorney, Agent, or Firm*—Thompson Hine LLP

(57) ABSTRACT

Thermally reversible light scattering materials are provided in accordance with the invention including a low melting, polymeric material dispersed in a polymer matrix; a first polymer which upon heating from a temperature below its melting point to a temperature above its melting point changes from a light scattering solid to a liquid, the first polymer being dispersed in a matrix provided by a second polymer to form a light scattering polymer material when cold and a less or non-light scattering material when hot; and thermally reversible light scattering materials which go from light scattering at lower temperatures to less or non-light scattering at higher temperatures. The thermally reversible light scattering materials of the invention can be incorporated in many applications including a window which can reversibly change from a privacy condition to a non-privacy or clear condition; a window which can reversibly change between displaying images or objects to obscuring images or objects; a layer which can reversibly change between being clear and frosted by cycling the temperature of the layer; a reversible display; a temperature indicating material or device.

30 Claims, No Drawings

THERMOSCATTERING MATERIALS AND DEVICES

BACKGROUND

A number of reversibly variable light transmission technologies based on changes between light scattering and less or non-light scattering conditions have been proposed or commercialized for a variety of intended uses. These technologies generally involve electrically induced and/or thermally induced changes. The materials with thermally induced, reversible changes between light scattering and less or non light scattering states can be termed thermally reversible light scattering, (TRLS), materials.

Polymer dispersed liquid crystal, (PDLC), technologies generally have involved liquid crystal droplets either physically dispersed in a polymer matrix, see for example U.S. Pat. Nos. 5,089,904; 5,082,351; 4,838,660; 4,815,826 and 4,435,047 or liquid crystal droplets formed by phase separation during curing of a reactive monomer/liquid crystal solution and/or by solvent removal, see for example U.S. Pat. Nos. 5,530,566; 5,087,387; 5,021,188; 4,888,126; 4,688,900; 4,685,771; 4,673,255 and 4,671,618. Droplet formation in the later case is due to decreased solubility of the liquid crystal material in the polymer being formed as compared to a higher solubility of the liquid crystal material in the monomer prior to curing. Droplet formation may also be due the polymer and the liquid crystal both being soluble in a solvent whereas the liquid crystal is insoluble or immiscible in the polymer and forms droplets within the polymer as the solvent is removed.

In general with PDLC materials, the index of refraction of the liquid crystal droplets is different from the polymer matrix material and a layer of the droplet containing material is light scattering and thus appears translucent, frosted or white. When a layer of PDLC is provided between two transparent electrode layers, a voltage can be applied to change the index of refraction of the liquid crystal droplets. As the index of refraction of the droplets approaches that of the polymer matrix the PDLC layer decreases in light scattering and with a high enough applied voltage the PDLC materials can become quite clear. Thus these devices are electrically operated or electrooptic variable light scattering devices although thermally induced changes from light scattering to clear or TRLS changes have been described for these material in U.S. Pat. Nos. 5,087,387; 5,021,188 and 4,888,126.

A more recently proposed electrooptic variable light scattering technology is based on what is called polymer stabilized cholesteric texture, (PSCT). With this technology a cholesteric liquid crystal is mixed with a small amount of a reactive monomer, placed in a very thin film between conducting layers and the monomer is allowed to react while an applied electric field holds the liquid crystal material in a clear or low light scattering state known as the homeotropic texture. Thus, the small amount of polymer matrix formed during the curing process favors or stabilizes this texture to some extent and the liquid crystal returns to it in the future when voltages of adequate strength are applied across the liquid crystal layer. In the absence of an applied voltage the liquid crystal material goes to a light scattering, focal conic texture. Devices with this technology rapidly switch between light scattering with no applied voltage to fairly low light scattering with an applied voltage. Examples of these materials and devices are given in U.S. Pat. Nos. 5,847,798; 5,695,682; 5,691,795; 5,644,330 and 5,570,216. Reverse mode device are also possible in which there is relatively little light scattering in the no voltage applied condition and the device becomes light scattering when a voltage is applied. PSCT technology lends itself to TRLS as heating a PSCT material from its mesomorphic phase with focal conic texture to it isotropic phase causes the polymer stabilized material to change from light scattering to less light scattering or clear.

One type of variable light scattering technology, that depends exclusively on temperature changes to cause changes in the light scattering nature of the materials, is based on the phenomenon know as lower critical solution temperature, (LCST), see for example U.S. Pat. Nos. 5,615,040; 5,525,430; 5,404,245; 4,952,035; 4,877,675; 4,832,466; 4,816,518; 4,772,506; and 4,260,225. With this technology, as the temperature is raised, a clear, transparent solution of a polymer in a solvent reaches a critical point at a particular temperature at which the polymer comes out of solution or phase separates to form a highly scattering material. Layers of this type of material have been proposed for use in window or roof situations where increases in ambient, outdoor temperature are enough to cause the transition from clear to frosted. The amount of backward scattered light is significant enough to have such windows and roof elements considered for providing energy savings in buildings that use this technology. They have also been described for use in displays and thermal recording materials in U.S. Pat. Nos. 4,952,035; 4,832,466 and 4,734,359. A reverse mode system which is reported to have materials with upper critical solution temperature, (UCST), behavior is described in U.S. Pat. No. 4,900,135. Both the materials based on LCST and those based on UCST qualify as TRLS materials.

Another type of thermally controlled, variable light scattering technology is suggested for use as thermally reversible recording media. Generally a low melting, relatively low molecular weight material is contained in a polymer matrix in these TRLS materials. In most cases, at low temperatures this composite material is light scattering. As the temperature is raised, above a certain point the material turns clear. To be useful as a recording media, this clear state is maintained by cooling the cleared material immediately after the temperature for clearing is reached. To erase a recorded image, the material is heated to a temperature significantly above the clearing temperature and cooling from this temperature regenerates the light scattering state of the material. Thus the preferred materials are bistable since they are stable in either the light scattering or the clear state at normal room temperature depending on their thermal history. For examples of this technology, see U.S. Pat. Nos. 5,965,484; 5,780,387; 5,747,413; 5,700,746; 5,298,476; 5,278,128; 4,917,948 and 4,695,528. Similar bistable, TRLS behavior has been described for liquid crystal polymers in U.S. Pat. Nos. 5,589,237 and 5,426,009 and for liquid crystals contained in an inorganic polymer matrix formed from fumed silica, see U.S. Pat. No. 5,729,320.

Thermally reversible light attenuating materials for various display and window applications are described in U.S. Pat. No. 4,268,413 to Dabisch. The TRLS materials of this invention are reported to comprise a polymeric or resinous matrix material and at least one organic substance embedded in the matrix material as a discrete phase. The organic substances embedded in the matrix material are relatively low molecular weight materials with melting points near or slightly above the desired transition between states with more and with less "light-absorbance". The change in the way the material attenuates light involves a change of the dispersed, embedded organic substance from a solid which is at least partially insoluble in the matrix material to a liquid which has an index of refraction that matches the index of refraction of the matrix. Alternatively, the change in light attenuation involves a change in the dispersed, embedded material from solid particles which have an index of refraction that matches that of the matrix to liquid droplets which are not soluble in the matrix and have an index of refraction that differs from that of the matrix.

Descriptions of electrooptic devices that are suggested for changes between clear and light scattering states are given by Beni, et al "Anisotropic Suspension Display" Appl. Phys. Lett. 39(3), 195–197 (1981) and "Electro-wetting Displays" Appl. Phys. Lett. 38(4), 207–209 (1981).

No description has been found of a polymer which undergoes a melting process from a solid to a liquid, said polymer being intimately interspersed in a second polymer for the purpose of providing a TRLS material. The TRLS materials of the present invention are termed thermoscattering, (TS), materials.

SUMMARY OF INVENTION

One manifestation of the invention is a low melting, polymeric material dispersed in a polymer matrix which together show TRLS properties.

Another manifestation of the invention is a first polymer which upon heating from a temperature below its melting point to a temperature above its melting point changes from a light scattering solid to a liquid, said first polymer being dispersed in a matrix provided by a second polymer to form a light scattering polymer material when cold and a less or non-light scattering material when hot.

The invention provides unique TRLS materials which go from light scattering at lower temperatures to less or non-light scattering at higher temperatures.

In one embodiment the invention is a material comprising an aliphatic polyester, a poly(olefin glycol) and/or a poly(olefin carbonate) interspersed in another polymer which shows TRLS properties.

In another embodiment the invention is a material comprising an aliphatic polyester, a poly(olefin glycol) and/or a poly(olefin carbonate) interspersed in polyurethane matrix which shows TRLS properties.

The invention provides a window which can reversibly change from a privacy condition to a non-privacy or clear condition.

The invention also provides a window which can reversibly change between displaying images or objects to obscuring images or objects.

The invention provides a layer which can reversibly change between being clear and frosted by cycling the temperature of the layer.

The invention also provides a reversible display.

The invention still also provides a temperature indicating material or device.

Another embodiment of the invention is a TRLS material which is part of a device such as a display or a window with an advantageous configuration and a control system which provides for low energy requirement for switching the material to and maintaining the material in its slightly or non-light scattering condition.

The invention uses materials which change from light scattering at a lower temperature to substantially less light scattering or clear at a higher temperature. The materials of the invention comprise a first polymeric material which upon heating from a temperature below its melting point to a temperature above its melting point changes from a solid to a liquid, this first polymeric material being interspersed in a second polymeric material which second polymeric material is a solid at temperatures below the melting point of the first polymeric material and remains a solid, at least for some range of temperatures, above the melting point of the first polymeric material. The second polymeric material serves as a matrix for the first polymeric material and is preferably, but not necessarily, a polymeric material which is crosslinked. The material formed by the interspersion of the first polymeric material in the second polymeric material preferably remains solid throughout the useful temperature range of the material and through out the transition between the light scattering state and the substantially less light scattering or clear state. It is also preferable that the liquid form of the first polymer be miscible with the polymer matrix formed by the second polymer. The materials of the invention may additionally comprise additives such as other polymers, ultraviolet light absorbers, visible light absorbers, infrared light absorbers, ultraviolet light stabilizers, visible light stabilizers, antioxidants, antiozonants, singlet oxygen quenchers, thermal stabilizers, plasticizers, solvents, dyes and/or pigments.

The invention provides windows which comprise the materials of the invention, such that windows of the invention change from light scattering to substantially less light scattering or clear as the temperature of the windows increases. The windows of the invention include multipane windows with the material of the invention comprised in one or more of the panes of the window. The windows, optionally comprise one or more heat reflective layers and/or one or more low emissivity layers.

The invention can provide devices which comprise the materials of the invention in association with a source of heat. The devices of the invention change from light scattering to substantially less light scattering or to a clear condition as the temperature of the devices is increased by the source of heat. The devices of the invention may comprise the source of heat and/or the means of bringing the source of heat into association with the materials of the invention.

The source of heat may be an electric power source which resistively heats a transparent or non-transparent electronically conductive material or layer in thermal contact or in thermal association with the devices of the invention. Examples are conventional strip heaters, wire heating coils, a thin metal foil or a metal film on a substrate and transparent heaters like a layer of tin doped indium oxide, (ITO), or fluorine doped tin oxide on a flexible or a rigid substrate. Other resistive heaters, that allow for light transmission, can be associated with or even embedded in the TS material and include an array of fine wires, a fine wire mesh and a metal grid pattern formed by additive or subtractive processes.

The source of heat may be a source of electromagnetic radiation such as ultraviolet, visible, infrared or microwave radiation in radiative contact with the devices of the invention. Examples are the sun, a light bulb, a microwave oven, a fire and a laser.

The source of heat may be an exothermic chemical reaction, such as the burning of a fuel in air, in thermal or radiative contact with the devices of the invention. Examples are a gas burning oven or grill, a gas torch and a fire like the accidental burning of a building or the intentional burning of wood in a fireplace.

The devices of the invention include variable transmission windows, privacy glass and panels, oven door windows, fireplace windows/doors, wood burning stove window, artistic and information displays, security glazing, variable reflectance mirrors, covers for light bulb fixtures, warning signs and temperature indicators. These and a variety of other uses are described in detail below.

DETAILED DESCRIPTION

Polymers are often characterized by various thermal transitions that take place as the temperature of the polymer is changed. Two of the most important transitions are glass transitions and solid to melt transitions, (see for example *Principles of polymerization* $3^{rd}$ Edition, by G. Odian, John Wiley and Sons, (1991) and *Textbook of Polymer Science*, $3^{rd}$ Edition, by F. W. Billmeyer Jr., John Wiley and Sons, (1984)). In some cases passing through the given $T_m$ or m.p. for a polymer results in little perceived change in the viscosity or light scattering character of the polymer. However some polymers undergo a dramatic change from what appears to be a light scattering, possibly crystalline solid to a relatively low viscosity liquid at or near their given melting point. Examples of polymers with a change from solid to liquid behavior, at temperatures of interest for the materials and devices of the present invention, can be found with aliphatic polyesters, poly(olefin glycols) and poly(olefin carbonates). Preferably, the polymers for melting from a light scattering solid state to non-light scattering liquids are relatively low molecular weight polymers, (number average molecular weight of about 600 to 50,000), which form moderately to highly crystalline solids. However, the principal requirement is that the polymer change from a solid state which is capable of scattering light to a liquid state which has little or no light scattering behavior.

If a first polymer with this dramatic type of melting behavior is thoroughly interspersed in a properly chosen second polymer which does not exhibit such melting behavior, (over the temperature range of intended use of the polymer combination formed by the interspersion), it has been discovered that a material can be formed which is light scattering at low temperatures and which is significantly less light scattering or clear, (little or no light scattering), at higher temperatures.

The combination of polymers will be light scattering at low temperatures if the second polymer can provide an environment that allows the first polymer to assume its solid, light scattering form when the combination is cooled. The polymer combination will be substantially less light scattering or clear, when the temperature is raised, if the first polymer changes to a clear liquid-like state and the interspersion of the liquid-like first polymer in the second polymer is such that there are few if any regions of either polymer present which are large enough to scatter light due the size of the region and the difference in index of refraction between the first polymer and the second polymer. In the high temperature condition, the combination should be particularly clear or low in light scattering if the interspersed, liquid form of the first polymer is miscible with the matrix formed by the second polymer. The material of the invention are a particular class of the TRLS which we term thermoscattering, (TS), materials.

First Polymer

The first polymer should be chosen based on a significant change from a solid, light scattering state to a clear, liquid state on melting, for its ability to intersperse in a second or matrix polymer, for its ability to form a light scattering condition in the combination of the polymers at lower temperatures and for compatibility at higher temperatures between the liquid or liquid like state of the first polymer and the second or matrix polymer. Compatibility between the first and second polymers means that the combination of the two is clear or significantly lower in light scattering at temperatures above the melting point of the first polymer and preferable means that the two polymers are miscible at temperatures above the melting point of the first polymer. The first polymers useful in the invention are not liquid crystalline materials. The first polymers useful in the invention are ones which melt from a light scattering solid to a clear liquid in the temperature range of the intended use of the TS material and/or device containing the TS material. Preferably the first polymer has a moderate to highly crystalline solid state.

Preferably the first polymer is one or more aliphatic polyester, one or more poly(olefin glycol), or one or more poly(olefin carbonate). The first polymer may be a copolymer of two or more of these polymers. The first polymer may be a combination, mixture or blend of two or more or these polymers or their copolymers.

The term aliphatic polyester is meant to include simple polyesters polymers with the following polymeric structures in which n and m are independently chosen from any value from 1 to 10:

or

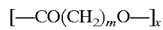

and x has a value of at least 3 and preferably x has values such that the polymers have a number-average molecular weight of from about 600 to about 50,000. The term aliphatic polyester also includes the polyesters that would be formed by the condensation reactions between monomers like $HOR_1OH$ and $HOOCR_2COOH$ in which $R_1$ and $R_2$ are independently chosen from linear or branched hydrocarbon chains containing from 1 to 10 carbons. Also included are aliphatic polyesters that would be formed if more than one type of diol monomer, (i.e. with different $R_1$ groups), and/or more than one type of diacid monomer, (i.e. with different $R_2$ groups), were present in the polymer forming reaction. Also included as aliphatic polyesters are the polyesters that would be formed by the condensation reaction of monomers like $HOR_3COOH$ in which $R_3$ is chosen from linear or branched hydrocarbon chains containing from 1 to 10 carbon atoms. Also included are aliphatic polyesters that would be formed if more than one type of acid/alcohol monomer, (i.e. with different $R_3$ groups), were present in the polymer forming reaction. Also included are the aliphatic polyesters that would be formed from the condensation reactions of all three of the above monomer types, if monomers with one type or a variety of different types of $R_1$, $R_2$ and $R_3$ groups were present. The term aliphatic polyester includes these polymers whether or not they are formed from the reaction of monomers like those above. For example, aliphatic polyesters may be formed from cyclic esters like ε-caprolactone. Aliphatic polyesters include polymers that are end capped with, for example, hydroxy and/or alkyl groups. Preferably the number-average molecular weight of the aliphatic polyesters is from about 600 to about 50,000.

The term poly(olefin glycol) is meant to include polymers with the formula $H(-OR_1-)_mOH$ in which $R_1$ is chosen from linear or branched hydrocarbon chains containing from 1 to 10 carbon atoms and m is preferably chosen so as to give a number-average molecular weight from about 600 to about 50,000. Also included are the poly(olefin glycols) that would be formed if more than one type of diol monomer like $HOR_1OH$, (i.e. with different $R_1$ groups), were present in the reaction. The term poly(olefin glycol) includes these polymers whether or not they are formed from diol monomers or, for example, from cyclic ethers like tetrahydrofuran. Poly (olefin glycols) include polymers that are end capped with, for example, hydroxy and/or alkyl groups.

The term poly(olefin carbonate) is meant to include polymers with the formula $HO[-R_1OCOO-]_mR_1OH$ in which $R_1$ is chosen from linear or branched hydrocarbon chains containing from 1 to 10 carbon atoms and m is preferably chosen so as to give a number-average molecular weight from about 600 to about 50,000. Also included are poly(olefin carbonates) that would be formed from the reaction of phosgene with more than one type of diol monomer like $HOR_1OH$, (i.e. with different $R_1$ groups), present in the reaction. The term poly(olefin carbonate) is meant to include these polymers whether or not they are formed from the reaction of diol monomers with phosgene. Poly(olefin carbonates) include polymers that are end capped with, for example, hydroxy and/or alkyl groups.

Preferably the first polymer is chosen from poly(1,6-hexamethylene adipate), poly(1,4-butylene adipate), poly (ethylene adipate), an aliphatic polyester/poly(olefin glycol) copolymer known as Terathane CL-2000, (which is a polycaprolactone-block-polytetrahydrofuran-block-polycaprolactone), poly(ethylene glycol), poly(ethylene glycol) methyl ether, poly(ethylene glycol) dimethyl ether, poly(propylene glycol), polycaprolactone, , poly (hexamethylene carbonate)diol and combinations, mixtures and blends thereof.

Since the material that forms light scattering sites is a polymer it has little or no chance of aggregating into pockets or migrating or diffusing out of the combination the way that a low molecular weight material could if it was used as the dispersed phase in a TRLS material.

Second Polymer

The second polymer should provide a matrix for the first polymer. The second polymer or the formation of the second polymer should provide for uniform interspersal of the first polymer within the matrix formed by the second polymer. The second polymer should allow for the formation of light scattering sites when the combination of polymers is cold and should provide for a clear or low light scattering material when the combination of polymers is hot. Preferably, the second polymer provides for miscibility between the liquid state of the first polymer and itself when the temperature of the TS material is above the melting point of the first polymer. The second polymer should serve to maintain the rigidity or "set up" nature of the combination of polymers even when the TS material is in its high temperature, clear or low light scattering condition. It is believed to be preferable for the second polymer to have high elasticity and/or a large free volume or large interstitial spaces even at low temperatures like normal room temperatures to allow for light scattering site formation by the first polymer. The term free volume of polymers is used here as it is described in *Macromolecules, An Introduction to Polymer Science*, especially pp. 348, 349 and 367–369, Edited by F. A. Bovey and F. H. Winslow, Academic Press Inc., (1979). It is preferable that the second polymer have a glass transition temperature below the transition temperature for light scattering site formation. It is preferable that the second polymer have at least some crosslink density so that it may better maintain its solid form even at high temperature in the presence of substantial amounts of the first polymer in its liquid-like form. Preferably the second polymer is chosen from one or more acrylics, one or more copolymers formed from ethylene and acrylic monomers, one or more polyurethanes or combinations thereof. More preferably the second polymer is chosen from UV cure acrylics, poly(methyl methacrylate), poly(ethylene-co-methacrylic acid) and the polymers formed by the reaction of Desmophen 1800, Desmophen 1100, poly(ethylene glycol), poly(propylene glycol), polycaprolactone, poly(hexamethylene adipate), poly(butylene adipate), poly(hexamethylene carbonate)diol, Terathane CL-2000, and combinations thereof with a polyisocyanate chosen from Desmophen N-3200, Desmophen N-100, Mondur MRS-4, Mondur MRS-5 and combinations thereof.

With many useful TS materials the first polymer acts as a completely independent interspersed polymer. For example, when poly(ethylene glycol) dimethyl ether is the first polymer and a crosslinked polyurethane made from a polyester polyol and a polyisocyanate is the second or matrix polymer there is no reaction between the poly(ethylene glycol) dimethyl ether and the polyester polyol or the polyisocyanate even if the poly(ethylene glycol) dimethyl ether is present during the formation of the polyurethane. This is because the terminal hydroxy groups of the poly(ethylene glycol) have been methylated. As another example, when polybutylene adipate, as a first polymer, is present during the formation of a UV cure acrylic matrix there are no expected reaction between the acrylic monomers and the polybutylene adipate during the curing reaction. Also, for example, when polybutylene adipate, as a first polymer, is melt mixed into a matrix formed by, for example poly(ethylene-co-methacrylic acid), there are no expected chemical reaction at all and the polybutylene adipate should be independent of the matrix with respect to attachment to the matrix by covalent bonds.

When a first polymer such as polybutylene adipate, (with a weight-average molecular weight of ca. 12,000), is present during the formation of a polyurethane matrix, some of the end groups on the polybutylene adipate may be hydroxy groups and have some chance of reacting with an isocyanate group. But the equivalent weight of the polybutylene adipate is so large that this reaction is considered inconsequential. Even if one or more of the terminal ends of the polymer chain were "tied up", the chain has so much length that portions of it could still participate in melting when heated and crystallite formation and/or light scattering site formation when cooled. When the second polymer is formed in the presence of the first polymer, the independence of the first polymer decreases when its equivalent weight is of lower values and it contains groups that are reactive with the components used to form the second polymer.

However it has also been discovered that many useful TS materials can be formed from a first polymer and a second polymer in which the second polymer is a crosslinked matrix formed from a portion of the first polymer. For example, a diol endcapped polymer like an aliphatic polyester, a poly (olefin glycol) or a poly(olefin carbonate) can be mixed with a polyfunctional crosslinking material like a polyisocyanate with a less than stoichimetric amount of isocyanate groups in the polyisocyanate as compared to hydroxy groups in the diol endcapped polymer. Only some of the diol endcapped polymer's hydroxy groups can participate in the formation of the polyurethane matrix. Some of the diol encapped polymer chains will remain free to act as a first polymer and if they fit the criteria for a first polymer, they may provide for TRLS.

Thus, for example, a polymer with hydroxy functionality of at least two can be reacted with a material with an isocyanate functionality of at least three. If a substoichiometric amount of isocyanate relative to the amount of hydroxy groups is used, a second polymer can be formed from a portion of the first polymer and the polyisocyanate and this polyurethane can serve as a matrix for the portion of the first polymer that did not react to form the matrix. As another example, the first polymer can have hydroxy functionality of greater than two and a difunctional or polyfunctional isocyanate can be used at the proper substoichiometric level to react with a portion of the polyol to form a second polymer to serve as a matrix for the remainder of the first polymer that did not react.

In this discovery, if the first polymer is difunctional, its polymer chains can end up in three different reacted forms, i.e. unreacted, reacted at one functional position or reacted at both functional positions. In curing with a substoichiometric amount of an at least trifunctional material, there will be a distribution of the original amount of first polymer between these three possible reacted forms that depends on the relative stoichiometry between the reactive groups. The unreacted chains can serve to give the material the ability to change between light scattering and non-light scattering states. The polymer chains reacted in one position might have a chance to participate in forming light scattering sites to some extent on cooling of the material as the chains have a free end and may partially solidify or crystallize. The chains that are reacted on both end are believed to form a matrix that does not participate in changes in light scattering ability like solidification, crystallization and melting. This is supported by the fact that generally with a true 1 to 1 stoichiometry between reactive groups and with no other polymers present, the cured systems do not exhibit TS character and are either clear and non-light scattering at all temperatures or are hazy and light scattering at all temperatures.

If the liquid form of the first polymer and the solid form of second polymer are miscible, it means that they act like a single phase with little or no light scattering, (see for example *Concise Encyclopedia of Polymer Science and Engineering* pp 629–632; executive editor J. I. Kroschwitz; published by John Wiley and Sons, Inc. (1990)). One way of picturing the miscible polymer combination in its high temperature, clear state is as polymer matrix containing a high molecular weight plasticizer. Another picture might be that of the first polymer as a high molecular weight solvent which solvates the chains of the second polymer and the second polymer as a matrix which holds the liquid-like first polymer in place. It is likely that this mutual interaction between the polymers which can be referred to as miscibility, gives rise to a lack of light scattering sites at high temperature in the combination of polymers and allows many of the materials of the invention to change to a clear state when heated. When there is miscibility between the liquid form of the first polymer and the matrix formed by the second polymer it means that there is no requirement for index of refraction matching between the dispersed phase and the matrix phase since they are acting as, or actually are, a single phase.

The discovery of first and second polymers that appear to be miscible at temperatures above the melting point of the first polymer and allow for light scattering site formation within the matrix at temperatures below the melting point of the first polymer is significant. In fact, whereas the low temperature or light scattering form might best be considered as a composite of the separate components, when the liquid form of the first polymer is miscible with the second polymer, the high temperature form of the materials of the invention might no longer be considered a composite even though it is a combination of two separate polymer systems.

In general, the materials of the invention change from their light scattering state to their clear state abruptly, (within seconds), on rapid heating to a temperature above the melting point of the first polymer. However, on cooling the change from the clear state to the light scattering state is not nearly as quick. In fact, materials of the invention that have been heated to their clear state can be cooled to temperatures $20^C$ to $30^C$ below their clearing temperature and will typically take 10 to 20 minutes or even as long as 3 to 4 hours, in some cases, to return to their light scattering state. This is presumably due to the slow rate of solidification, (which may involve crystallite formation), of the chains of the first polymer especially when those chains are interspersed and entangled in each other and the second polymer. On the other hand, the steady state temperature at which the clear state can be maintained is only slightly below the temperature at which clearing originally took place. Thus at very low heating and cooling rates there is only a little hysteresis between the clearing and frosting points of the materials of the invention.

TS materials have been discovered that have a transition temperature for changing from light scattering to clear at almost any temperature in the range of about $-14^C$ to about $70^C$. Mixtures of different types or different molecular weights of the preferred polymer useful as first polymers can be used to achieve transition temperatures that are intermediate to single polymer type or molecular weight. Additives also can be effective in modifying the transition temperature of TS materials.

The temperature of transition or range of temperatures over which the transition from light scattering to substantially less light scattering takes place depends on the melting point of the first polymer and the environment of the first polymer provided by the polymer matrix. With the materials of the invention, the first polymer is in such an intimate dispersion with the second polymer that the second polymer can serve as a material that provides melting point depression. If the second polymer provides several different or a range of different environments to the first polymer, portions of the first polymer will melt at different temperatures or over a range of temperatures. In addition as discussed above, in some cases, a portion of the chains of the first polymer have the possibility of being attached to the second polymer on one end and therefore may participate differently in melting and solidification than unattached polymer chains. Thus heating the TS materials of the invention to a temperature above the melting point of the first polymer usually results in a complete transition to the less or in most cases non-light scattering state, but heating the materials to temperatures below the full transition temperature and holding the material at that temperature results in a partial transition or partial clearing. If the temperature is controlled over the proper range of temperatures, the materials can be controlled at intermediate level of light scattering. Therefore, most of the materials of the invention are gray scale controllable with respect to the amount of light scattered by the material over the range from the most light scattering state to the least light scattering state.

The relative amounts of first and second polymer are limited on the end of large amounts of first polymer by the need to have a material that is solid or set up even at high temperatures and at the other end of having small amounts of first polymer by the need to have a material that actually turns light scattering when it is in its low temperature condition. In a few cases for polyurethane based TS materials, where the second polymer was formed from a portion of the first polymer, an attempt was made to use a 1 to 1 ratio of hydroxy groups to isocyanate groups. Unexpectedly, a slight amount of TS activity was observed with these samples, especially when they were quite cold. That this happens may be due the polyisocyanate material having a higher than reported equivalent weight or the material may have lost isocyanate groups due to water absorption from the atmosphere during use or there may be small amounts of residual water in the diol or polyol such that not all of the hydroxy groups from the diol or polyol are tied up in polymer matrix formation. If this is the case some of the diol or polyol polymer chains may be free to participate in light scattering site formation on cooling. However in general, the percentage by weight of the total weight of a TS material made up by the first polymer ranges from about 5% to about 85%. Preferably the weight percentage of the total weight of a TS material made up by the first polymer is from about 10% to about 80%.

In a TS material with an unreactive or slightly reactive first polymer and a polyurethane based second polymer which is formed from the reaction of a hydroxy containing material and a isocyanate containing material, the ratio of hydroxy groups to isocyanate groups can range from 1:2 to 5:1 and is preferably from 1:1 to 4:1.

The extent of the clarity of at least some to the materials of the invention is quite remarkable. Samples have been prepared that appear pure white and highly light scattering in their cool, frosted state and have no observable color, haze or light scattering when viewed with the human eye in there high temperature, clear state even though some samples are at least 4 centimeters thick.

Methods of Making and Fabricating TS Materials

The TS polymer combinations may be formed by making a solution of the first polymer in one of the components that can be reacted to form the second polymer. This solution is usually formed at a temperature above the melting point of the first polymer. One or more additional components that are to be reacted to form the second polymer system are then added along with any desired catalysts and/or initiators. The reaction to form the second polymer is then allowed to proceed. This reaction often takes place at a temperature above the melting point of the first polymer. Volatile by-products of the polymerization reaction, if any, may be removed by heating and/or exposure to vacuum.

In a preferred methods of making the materials of the invention, the first polymer is dissolved in a crosslinkable but as yet uncrosslinked second polymer. This solution is maintained at a temperature above the melting temperature of both of the polymers and a single phase, solution is formed by the two polymers. A crosslinking agent is added. This crosslinking agent may be a difunctional or polyfunctional monomer, oligomer or polymer. The crosslinking reaction may proceed on its own or it may be accelerated by catalytic or initiator means added to the polymer mixture. The crosslinking reaction may be an addition reaction, a condensation reaction, a free radical initiated reaction or any other well know reaction for crosslinking polymer chains. Once the crosslinking reaction has proceeded to a significant extent, the liquid solution will set up to form a non-flowing material. With the TS materials of this type, the set up material will be clear (i.e. little or no light scattering). On cooling the material will change to a substantially greater light scattering state. The preferable second polymers formed by this method are crosslinked polyurethanes.

TS material may be formed by melting the first and second polymer and mixing them together in the melt to form a uniform dispersion or solution. On cooling, the first polymer forms light scattering sites in the matrix provided by the second polymer. To be useful, the melt mixed TS material changes from light scattering to less light scattering at temperatures near the melting point of the first polymer and below the melting point of the second polymer. This allows the second polymer to maintain a solid, although possibly softened, matrix for the first polymer even in the clear state. The preferred second polymers for melt mixing are low molecular weight acrylic polymers and copolymers formed from ethylene and acrylic monomers.

TS materials may be formed by dissolving the first and second polymers in a solvent or solvent system, followed by removal of the solvent(s).

In another preferred method of making materials of the invention, the first polymer is melted and a UV curable material is added. The solution of the first polymer and the UV curable material is held at a temperature above the melting point of the first polymer while the solution is exposed to UV light. The reactions initiated by UV light cause the formation of a second polymer in the form of a matrix surrounding the first polymer. TS site formation takes place on cooling if the UV cure material allows for solidification of the first polymer within its matrix. The preferred UV curable material is an acrylic material.

A TS material may be formed by dissolving one or more monomers which may be reacted to form the first polymer in a solution of a solvent and the second polymer, (or without an added solvent if the second polymer is soluble in the monomer(s) used to form the first polymer). Any desired catalysts and/or initiators are then added and the polymerization reaction to form the first polymer reaction is carried out, normally at an elevated temperature or with exposure to electromagnetic radiation. This is followed by removal of some or all of the solvent if one was used.

A TS combination may be formed by dissolving the first polymer in a solution of monomers, oligimers, crosslinking agents and/or polymer chains that can be reacted to form the second polymer. Optional inert solvent(s), catalyst(s) and/or initiator(s) may be present in the solution. The reaction to form the second polymer is then carried out, followed by solvent removal if present and if removal is desired.

Some of these methods of making TS materials involve having the first polymer in solution with the second polymer or one or more of the components used to form the second polymer. A homogenous solution is the ultimate dispersion or means of interspersing one material in another. When the TS material is formed at temperatures above the melting point of the first polymer, cooling results in light scattering site formation via solidification from the highly dispersed state. Re-heating the TS material allows the first polymer to return to its highly dispersed state to form very clear materials even when the materials are in thick forms. By way of comparison, a TRLS material can be formed by dispersing a fine powder of an aliphatic polyester in the precursors to a polyurethane matrix and then allowing the precursors to react at a temperature below the melting point of the aliphatic polyester. This results in a material that becomes less light scattering when heated but does not become nearly as clear on heating as the TS materials of the invention.

An advantageous method of forming a TS material, for certain applications, is provided by making the TS materials of the invention in the form of powder or particles, which optionally may be beads or spheres, followed by having the powder or particles dispersed in a clear polymer material or layer. The TS material formed in this manner has a high probability of having an optically clear state, with little or no distortion or light scattering, if the clear polymer material in which the particles are dispersed is the same or similar to second polymer that makes up the matrix portion of the TS particles. The TS particles can be formed by making a bulk sample of the TS material by one of the methods described above and then comminuting the material to any desired particle size.

Alternatively, the TS particles can be formed by dispersing the components used to form the particles in an inert liquid, (a liquid in which the components are not substantially soluble and with which the components do not substantially react), followed by allowing the particle forming components to react, if a reaction process, for example crosslinking, is used to form the TS material. The rate of reaction may be facilitated by heating or by the addition of a catalyst or an initiator. The TS particles thus formed may be filtered from the inert liquid and rinsed and dried if necessary.

The particles formed by comminution or by dispersion in an inert liquid or by some other process can be used directly as a TRLS particles in variety of applications, for example, temperature indicating applications. Also, these particles can then be dispersed in a polymer or polymer forming system to form a TS material or layer with the advantage that the polymer or polymer forming system can be formed or processed under conditions that are different from the conditions for the formation of the TS particles themselves. For example, the clear polymer or its precursors in which the particle are dispersed could be dispensed, used in lamination processes, cast or otherwise formed at room temperature while the particles or a TS material that did not involve this particle process would normally be used or processed at temperatures above the melting point of the first polymer.

The following is a general procedure for preparation and use of one type of TS particle. An aliphatic polyester as a first polymer, with a melting point above room temperature, and the precursors to the formation of a polyurethane matrix are stirred together in an inert liquid with an optional surfactant to promote dispersion and/or emulsification. For example, the polyurethane precursors may be a polyester polyol and a polyisocyanate material which are liquids at room temperature. The inert liquid is heated to above the melting point of the aliphatic polyester and the mixture is vigorously stirred to form liquid droplets containing the aliphatic polyester, polyester polyol and the polyisocyanate. In each particle or droplet the polyisocyanate reacts with the polyester polyol, with or without an added catalyst, to form a polyurethane matrix or second polymer in which is interspersed the aliphatic polyester, first polymer. On cooling the light scattering particles are filtered out, rinsed and dried.

These particle can be used as they are as particles that reversibly change between light scattering and clear. Alternatively, they can be dispersed in a clear polymer material to form a TS composite. An advantageous TS composite would be formed by dispersing the particles in the polyester polyol and the polyisocyanate used to make the particles. In this case the particles are surrounded by the same polyurethane that serves as the matrix or second polymer in the particles. In this way the particles, in their clear condition, have a high probability of closely matching the index of refraction of the polymer material in which the particles are dispersed. The aliphatic polyester in this case is localized in the regions made up by the original particle and upon raising the temperature above the melting point of the aliphatic polyester a transition takes place to form clear particles within the clear polymer material surrounding the particles to give a clear or nearly clear overall material.

When a polyurethane is used as the second polymer it can be formed by allowing hydroxy groups to react with isocyanate groups at room temperature or at elevated temperatures. This reaction can be accelerated anywhere from a little to very substantially by the addition of catalysts. The preferred catalysts for accelerating the polyurethane formation reaction are tertiary amines and organotin compounds. Particularly preferred are Desmorapid PP from Bayer Corporation of Pittsburgh Pa. and dibutyltin dilaurate.

The TS polymer materials may be formed by other methods as will be obvious to those skilled in the art of polymer technology.

The TS material can be processed into useful forms by spreading the precursors for the formation of the TS material on a substrate like a sheet of glass or a sheet or film of plastic. The glass or plastic can optionally have been previously or can be subsequently coated with a conductive layer, transparent or non-transparent, to serves as a heater. The precursors can be coated by processes which include drawing, bladeing, roll coating, curtain coating and various types of printing. A variety of types of coating processes useful for the materials of the invention are described in *Liquid Film Coating* edited by S. F. Kistler and P. M. Schweizer, Chapman and Hall, (1997).

The precursors to the TS materials can also be provided between two substrates such as sheets of glass, sheets of plastic or a combination of the two and the TS material can serve as a lamination layer for the two substrate layers. In the clear state the TS materials can be close in index of refraction to the substrates and suppress reflection from the interface between the TS material and the substrates. Also a free standing sheet of TS material can be used to laminate two substrates together or a free standing sheet of TS material can be laminated in between substrates with other bonding layers like polyvinylbutyral, polystyrene or polyurethane. In certain privacy glass applications it is of significant advantage for the TS layer to bond well to glass and form an effective laminating layer. It has been discovered that some of the TS materials of the present invention are particularly good at forming a laminating layer between sheets of glass. For example, a TS layer made with a 2 to 1 ratio of hydroxy groups to isocyanate groups with PBA-de-1,000 and Desmodur N-3200 forms well bonded layers to glass while some loss of adhesion is observed between the TS layer and sheets of glass at the same ratio of hydroxy to isocyanate with PBA-de-1,000 and Desmodur N-100.

Improved bonding to glass is obtained by incorporating coupling agents in the TS layer precursors when they are used to form a laminating layer with glass substrates. Preferred coupling agents are silane coupling agents and titanate coupling agents. The coupling agents may have groups that react with the precursors or they may be unreactive. The coupling agents may be monomeric or polymeric in nature. An extensive discussion of coupling agents is given in *Silane Coupling Agents*, $2^{nd}$ Edition, E. W. Plueddemann, Plenum Press (1991) and *Silanes and Other Coupling Agents*, K. L. Mittal Editor, VSP BV (1992).

The TS material can be formed into freestanding objects and forms by processes like molding, extrusion and casting. The molding may involve reactive injection molding in which the precursors, including optional catalysts, are meter mixed and then injected into a mold where the precursors react to form the TS material at room or elevated temperatures. A reactive extrusion process can be used to form freestanding sheets of TS material by meter mixing the precursors, including optional catalysts, and then forcing the mixed precursors through a slit into a reaction zone in which the precursors react to form the cured product. Freestanding film materials can be used as is or can be used in subsequent lamination processes to bond substrates together.

An interesting configuration for the TS material is a film of the material with an embedded fine metal mesh to serve as an a resistive heater in intimate thermal contact with the TS layer. The fine metal mesh can be like that used as a resistive heater in heated windshields or windscreens on certain motor vehicles and as such it is highly transparent to light and still low enough in electrical resistance to provide effective heating when electrical power is passed through the mesh. The mesh can be made from a variety of metals and metal alloys including copper, nickel, chromium, silver, steel, stainless steel, nickel-chromium alloys, etc. If this TS film with embedded metal mesh is used in a freestanding configuration, the thermal mass of the system is small compared to a TS layer coated on a fairly large substrate or laminated between two fairly large substrates since in these latter cases the substrate(s) must be heated as well as the TS layer. The freestanding configuration can be a layer or film by itself in air or it can be a part of a double pane or a triple pane glazing unit with gas spaces between the layers of the unit. If it is part of a triple pane glazing unit, it is preferable that the TS layer with embedded metal mesh be the middle pane or layer of the glazing unit. In the double or triple pane glazing units, one or more heat reflective or low emissivity layers can be used, if desired, to minimize heat loss and reduce power consumption for maintaining the TS layer in its high temperature clear or low light scattering mode.

In a multiple pane glazing unit with a TS layer, the layer can also be coated on a sheet of glass or plastic, but if this sheet is relatively thick, it will have relatively large thermal mass and will increase the energy requirement for heating the layer to its clear condition. The advantage of having low thermal mass, that would be achieved with the metal mesh described above, would also be achieved by providing the TS layer on a thin substrate like a polyester film. The polyester film can be coated with a transparent conductor such as the products sold under the names Altair™ or Heat Mirror™ by Southwall Technologies of Palo Alto, Calif. As in other cases, these transparent conductors can serve as heat reflectors and low emissivity layers as well as transparent heaters.

Control

In the case that the TS layer is configured in a relatively low thermal mass situation, it has been discovered that the slow rate of return to the light scattering mode can be used to advantage. The discovery is that the TS layer only needs to be heated to a temperature above its clearing point or clearing temperature for just a brief period of time, for example 5 to 60 seconds and this only needs to be done approximately every 10 minutes to as much as every 3 or 4 hours depending on the TS material involved and ambient temperatures in which the window or device is being used. With this kind of control, the TS layer can be maintained in its clear mode over long periods of time with low to very low overall energy consumption. A timing circuit in conjunction with the power supply can be set to the particular time on/time off requirements for the particular window or device size and configuration and for the particular TS material(s) being used. This control approach is much less effective when the TS layer is on a substrate with relatively large thermal mass as the energy required to intermittently heat the large thermal mass above the clearing point or clearing temperature is nearly as large as the energy consumption for maintenance of the layer and substrate at a temperature that maintains the clear mode.

Another way of controlling and minimizing the power to maintain the clear condition of the TS material in an actively controlled window or device, is to supply power to the means of heating only when the TS layer is starting to return to its light scattering condition. The return to the light scattering condition is readily detected by a light source and a light detector that are near each other and near a portion of or layer of the TS material. The light source may be any type of light source but is preferably a light emitting diode and the light detector may be any type of light detector but is preferably a photodiode or a photoresistor. The light source and the light detector can be aimed directly at each other with the light beam passing through a portion or layer of TS material. In this case, the on-set of light scattering in the material between the source and the detector causes a decrease in the signal output of the light detector. Alternatively the light source can be directed at an off angle with respect to the light detector and the on-set of scattering in the TS material can cause an increase in light directed to or scattered to the light detector and thereby cause an increase in the signal from the detector. In either case, the signal from the light detector can be used in a control circuit to determine when power should be applied to the means of heating the TS layer.

Devices incorporating TS materials whose temperatures are actively controlled can use control mechanisms that include thermostats or thermoregulators in conjunction with electronic control circuits. The temperature can also be regulated by incorporating positive temperature coefficient materials in thermal association with TS layer and in line with the electrical system that provides power to actively control the temperature of the TS material. In this way the positive temperature coefficient materials can prevent overheating by having their resistance to electric current flow increase with increasing temperature, (especially a dramatic resistance increase starting at a given temperature), and thus decrease the power supplied to the heater in the device. In a similar way a bimetallic switch can be used as a thermoregulator or thermo-shut off mechanism. In general, the control mechanisms can be manual, automatic or involve remote control by infrared or radio frequency signaling. Remote control is especially useful for heater control circuitry in difficult to reach locations or in situation that are difficult to provide with external wiring like with multipane windows.

Additives

In addition to the first and second polymer, the TS materials of the invention may contain additives such as other polymers, ultraviolet light absorbers, visible light absorbers, infrared light absorbers, ultraviolet light stabilizers, visible light stabilizers, antioxidants, antiozonants, singlet oxygen quenchers, thermal stabilizers, plasticizers, solvents, dyes and/or pigments.

Good, although not exhaustive lists of antioxidants, singlet oxygen quenchers, light absorbers, light stabilizers and pigments are given in columns 13 and 14 of U.S. Pat. No. 4,425,161 to Shibahashi et. al. and columns 3–7 of U.S. Pat. No. 5,688,592 to Shibahashi et. al. Preferred light absorbers and/or stabilizer materials include benzotriazoles, benzophenones, cyanoacrylates, hindered amines, oxalanilides and substituted triazines. Materials that are not good UV absorbers but provide increased stabilization in the TS material are hindered amine light stabilizers, (HALS). Preferred light absorbers and light stabilizers for use in the TS material of the invention are those described by M. Dexter in "Kirk Othmer Encyclopedia of Chemical Technology, $3^{rd}$ Edition, Vol. 23, Pp. 615–627, John Wiley and Sons, Inc. (1983). Most preferred are 2-hydroxy-4-(octyloxy) benzophenone from Aldrich Chemical Company Inc. of Milwaukee, Wis.; Uvinul 3039, (2-ethylhexyl 2-cyano-3,3-diphenylacrylate) available from BASF Corporation of Rensselaer, N.Y.; Norbloc 6000, (2-(2'-hydroxy-5'-(2-hydroxyethyl)phenyl)benzotriazole) available from Janssen Pharmaceutica of Titusville, N.J.; Tinuvin 144, (bis(1,2,2,6, 6-pentamethyl-4-piperidinyl) (3,5-di-tertbutyl-4-hydroxybenzyl)butylpropanedioate), available from Ciba Specialty Chemicals of Tarrytown, N.Y. and Tinuvin 213, (poly(oxy1,2-ethanediyl)-α-[3-[3-(2H-benzotriazol-2-yl)-5-(1,1-dimethylethyl)-4-hydroxyphenyl]-1-oxypropyl]-ω-[3-[3-(2H-benzotriazol-2-yl)-5-(1,1-dimethylethyl)-4-hydroxyphenyl]-1-oxypropyl] and poly(oxyl,2-ethanediyl)-α-[3-[3-(2H-benzotriazol-2-yl)-5-(1,1-dimethylethyl)-4-hydroxyphenyl]-1-oxypropyl]-ω-hydroxy), available from Ciba Specialty Chemicals of Tarrytown, N.Y.

Preferred visible light absorbing dyes are Quinoline Yellow, (Solvent Yellow 33, C.I. 47000); Celestine Blue, (Mordant Blue 14, C.I. 51050); Quinizarin, (1,4-dihydroxyanthraquinone, C.I. 58050) and Malachite Green Carbinol base, (Solvent Green 1, C.I. 42000:1) all available from Aldrich Chemical Company Inc. of Milwaukee, Wis. Preferred NIR absorbing dyes are Keysorb 970 and Keysorb 1026 available from Keystone Aniline Corporation of Chicago, Ill.

Additives, if present, are typically added at a levels from where they first become effective in providing their intended effect, (such as stabilization, tinting or modification of clearing temperature or speed), up to level where they reach their solubility limit in the TS material system or a level at which they interfere with the function or physical properties of the TS material. Other guidance on the level of additives can be obtained from the examples given below and the general practice in the art of polymer additives.

A type of additive, other than those listed above, has been found to have a beneficial effect on the performance of the TS materials of the invention for certain applications. In particular, the addition of fumed silica has been found to retard or enhance the rate of return to the light scattering condition upon cooling while having very little effect on the clarity of the high temperature, "clear" state. A wide variety of fumed silicas and treated fumed silicas are of interest including Cab-O-Sil® products from Cabot Corporation of Naperville, Ill. and Aerosil® products from Degussa A. G. of Frankfurt, Germany.

Uses

We have found a number of uses, some of which are believed to be unique, for the TS layers of the present invention and for TRLS materials in general. For example, a TRLS layer may be used in a situation where privacy is desired at some times and a clear view is desired at other times and in some situations these windows eliminate the need for costly window treatments like shades and blinds. Windows that incorporate TRLS materials are useful in conference rooms, offices, as part of office partitions, windows on jewelry store display cabinets, windows on cabinets that contain valuable items like stereos, televisions and safes, windows that separate stores from public areas in shopping malls, and windows in office building and houses. Another privacy glass application involves shower doors. An application that automatically provides cooling to speed transition to the frosted state involves variable transmission windows on refrigerators, freezers and display coolers in stores. The TRLS layer may cover part or all of the window in all of the above window applications and may be applied as a uniform layer or in certain decorative patterns like stripes, circles or diamonds. Several different TRLS materials, each with a different temperature for clearing/frosting, can be used and the temperature of the layer can be controlled to clear/frost some or all of these TS materials when clearing/frosting is desired. The layer of TRLS materials may vary in thickness across a window or device and clear in a sweeping or a shutter type manner. The window applications that involve sunlight exposure may incorporate enough sunlight energy absorbing character, in thermal association with the TS material, such that the sun provides all or a portion of the energy to cause the window to spontaneously clear in sunlight.

TRLS materials are useful in variable reflectance mirrors. A light scattering layer formed on or near a specularly reflecting layer still appears highly light scattering when it is in its scattering condition and provides for good specular reflection when the material is in its clear condition. For specularly reflecting layer in displays, localized areas with TRLS material provide excellent contrast with those areas not coated with TRLS when the materials are in their scattering condition and provide little or no contrast when the TRLS materials are in their clear condition. This is especially true with the TRLS materials of the present invention. The lowest contrast for this and other display applications is obtained when the areas that are not covered with TRLS material are covered with a material that matches the characteristics of the TRLS material in the clear condition. For the TS materials this is mostly readily achieved by surrounding the TS areas with areas of the second polymer that do not contain the first polymer are hence are very close in nature to the TS material.

TRLS materials are useful as a temperature indicators. Applications using this feature include a TRLS coating on part or all of a baby bottle that would clear when the contents were warm or hot and would turn light scattering when the contents were cooled. Another application is a warming bag for, for example, food or pharmaceuticals which bag indicates when the contents has reached a certain temperature by changing from frosted to clear and a freezer/refrigerator bag that with the proper choice TRLS material turns from clear to frosted at freezing or some other desired temperature and turns back from frosted to clear on thawing or warming. A desirable use of the TRLS materials of the invention involves shower heads which change from frosted to clear to indicate when the water passing through and out of the shower head is warm or hot. Similarly the TRLS materials are useful as temperature indicators in a variety of water faucet or water line application in which there is a desire to know if water flowing through the faucet or line has reached a particular temperature, either hot or cold. Other temperature indicator applications include hot water bottles, tea cups, coffee cups, beer mugs, coolers and vacuum insulated bottles and flasks. In all of the temperature indicating applications above, the items or products may have areas, bands, stripes or spots provided by several different TRLS materials with different temperatures for changing between frosted and clear or TRLS materials of different thickness or controlled variation in thickness. This will allow the materials to indicate just how hot or how cold are the product or the contents of the product which incorporates the TRLS materials on the basis of how many stripes, bands or spots are clear or what proportion of a variable thickness layer clears in a certain time. Also the TRLS layers may reversibly reveal and conceal symbols and/or numbers based on the temperature of the materials.

Other applications include placing the TRLS materials or layers in association with things that become warm or hot in there normal use. One example of this type application is provided by the doors of a fireplace or wood burning stove that clear up when the fireplace or stove is in use but frost up and obscure the view of the inside when the fireplace or stove is not in use. Another application involves see through doors or window packs in doors or window packs in other places on conventional, convection, microwave and hybrid ovens that change from frosted to clear while the oven is in use to reveal the contents of the oven and change from clear to frosted to hide the contents of the oven when it is not in use. TRLS layers can be used to provide variable transmission for a window or a portion of the cover for gas or charcoal grills. In these window applications, the see through doors and windows optionally involve multipane construction with gas spaces between the panes and optionally involve heat reflective coatings on the transparent layer(s).

TRLS layers or coatings are also useful in conjunction with light and lighting fixtures, including automobile head lamps, such that the layers heat up and clear when the lights are turned on and frost up and obscure the inside of the light or fixture when the lights are off. Among other places, this is of interest for high intensity discharge lamps in motor vehicles where the lamp housing is not sealed and unsightly condensation causes appearance concerns. Other applications involve providing variable transmission possibilities to appliances like bread makers, pizza makers, slow cookers, rotisseries, rice makers, toasters and toaster ovens, shaving lotion dispensers and heating pads.

In conjunction with microwave ovens and other microwave sources, it has been discovered that the TS materials of the invention are effective absorbers of the wavelength of microwaves that are used in household cooking type microwave ovens. Thus microwaves are an effective means of heating the material of the invention and thus an effective means of causing the materials to change from light scattering to clear. If a microwave beam is directed in a localized area it is effective to cause localized clearing. Since the materials are effective absorbers of microwave energy they are useful as barriers to the passage or leakage of microwaves and are effective in suppressing reflection of microwaves of certain wavelength from objects coated with the materials of the invention. The TS materials can be incorporated in various containers for use in microwave ovens to provide localized heating and/or indication of temperature of a container or its contents.

An application that also involves spontaneous heating under undesirable conditions involves fires in homes and buildings. TRLS layers can be provided in association with fire rated glass to provide indication of fire and serve to indicate where there are hot spots by changing from frosted to clear. TRLS layers on fire doors or even on walls can turn clear under fire conditions to reveal warnings underneath the TRLS layers.

TRLS materials that clear on heating are useful in signs or displays in at least three configurations. One configuration involves a layer of TRLS material which uniformly covers the information such as letters, numbers and symbols. When the layer is cold the information is obscured and when the layer is warm or hot and layer is clear, the information is revealed. A second configuration involves a layer which contains both the desired information and a background that match each other when the TRLS material is in its light scattering condition. Either the desired information or the background is made up of the TRLS material and the other is made up of a thermally inactive material. The information is revealed when the layer is heated above the clearing point as either the information or the background clears and reveals the information in contrast to the other part of the layer.

The third configuration involves a layer which contains both the desired information and a background that match each other when the TRLS material is in its clear condition. Either the desired information or the background is made up of the TRLS material and the other is made up of a thermally inactive material. The information is revealed when the layer is cooled below the frosting point as either the information or the background turns light scattering and reveals the information in contrast to the other part of the layer.

The displays can spontaneously change due to changes in the temperature of the environment around the displays such as with warning signs that would indicate, for example, the possibility of freezing or slippery conditions or the fact that something is hot like beach sand on a sunny day. Alternately, the temperature of the sign or display can be actively controlled by heating the TRLS material by a variety of means including a resistive heater supplied with electric power. Cooling of actively controlled signs or displays can be provided by allowing heat to be dissipated to the environment. Also, relatively high speed, reversible appearance and disappearance of information is provided by placing the TS material based display or sign in association with a thermoelectric device that can alternately provide either heating or cooling or by the use of a conventional heater and another active cooling system like a fan, a flowing liquid or a refrigeration unit. The actively controlled displays are useful for point of purchase displays and almost any type of information display in which slow switching is acceptable, including relatively slow multi-segment displays with relatively high information density.

The preferred TRLS materials in all of the application described are the TS materials of the present invention. TS materials are useful in providing variable transmission light scattering control to portions of almost any device or process that involves temperature changes.

Maintaining the TS materials at high temperatures while they are exposed to the atmosphere for prolonged periods of time, (e.g. maintaining TS window at 85C continuously for 2 months), can cause the TS material to turn yellow at the edge of the window. This is presumably due to oxygen and/or moisture effects on the material at this temperature. It has been observed that the unexposed portion of the TS material are unaffected by prolonged high temperature operation. This sensitivity to exposure to the environment at elevated temperatures can be decreased by the use of additives like antioxidants and thermal stabilizers. Another effective means of stabilizing the TS materials for prolonged high temperature operation involves encapsulating the materials or edge sealing devices that contain the materials. Encapsulants and edge sealants can be low melting glasses, thermoplastic materials or thermoset materials. Preferred edge sealants are epoxies with low oxygen and moisture permeability.

Thermoscattering Windows

A TS window can be prepared by having free standing layer of TS material or by coating a layer of TS material on a substrate like a sheet of glass. If the substrate is plastic it may be rigid or flexible and may be acrylic, (e.g. polymethylmethacrylate), sheet material, polycarbonate sheet material, polyester, various types of vinyl, fluorocarbon polymers, polyolefins, polystyrene, polyurethane, acetate or any plastic material that can be formed into transparent sheets, either rigid or flexible. A preferred plastic substrate is a polyester sheet or film.

If the substrate is glass it may be soda/lime glass, borosilicate glass or any of a variety of clear or tinted glass types commonly known in the art of glass making. The glass may be formed into sheets by various processes including the drawn sheet process or the floatline process. Preferred is soda/lime glass, particularly soda/lime glass made into sheet form in the floatline process.

The TS layers on the substrate can be from about 0.05 millimeters to about 4 millimeters thick. The layers can be uniform or vary in thickness. Several different TS materials can be coated on a single substrate either in different areas or different layers which overlay each other.

A major concern for actively controlled TS windows of the invention is the energy requirement for heating to a temperature to cause switching from the light scattering mode to the clear mode and the energy requirement for maintaining the window in the clear mode. While having the TS material on a substrate with low thermal mass decreases the energy requirement for initial clearing, the rate of heat loss or dissipation to the surroundings, is often similar for windows with substrates of high and of low thermal mass. An effective method for decreasing the rate of heat loss is to provide a confined gas space on one or both side of the TS window pane. The confined gas spaces are provided by separate substrate(s) in a parallel spaced apart relationship to the substrate with the TS layer and by an edge spacer/seal like that in double or triple pane windows, also known as insulated glass units, (IG units).

The space between the substrates in a multipane TS window configuration can be evacuated or it can be filled with a gas like air, nitrogen, carbon dioxide, sulfur hexafluoride, argon, xenon or krypton. The thickness of the gas space will have an optimum value based on the thermal conductivity of the gas chosen and the requirements for minimization of thermally induced convection. Apart from the excellent insulating properties of a vacuum, a gas like krypton with its low thermal conductivity and low kinematic viscosity is preferred since its optimum spacing is relatively thin compared to other gases and having a thin gas space helps minimize the effects of thermal expansion in the gas space due to heating of the gas. Inert gasses can also serve to protect the TS layer from the effects of high temperature exposure to oxygen and moisture.

In addition to low heat transfer gasses, the heat loss from the TS window structure can be decreased further by the use of heat reflective and low emissivity coatings. A preferred placement of these coating is such that they effectively reflect heat or infrared radiation back to the TS layer or minimize radiative type thermal loss from the TS layer. As the heat reflective and low emissivity layers are relatively expensive there number should be minimized and there placement should be judicious.

On the other hand, the heat loss from an actively heated window can be used to advantage in certain window situations where interior heating is in use and where having a window with a warm interior surface minimizes thermal convection of inside air past an otherwise cold window surface. This window configuration provides the opportunity for privacy when the window is not heated and provides the opportunity to contribute to heating and minimization of heat loss when it is heated.

A preferred multipane TS window configuration involves a first substrate, as an outside pane, which is coated with a heat reflective layer on the side facing the interior of the configuration. A second substrate, as a middle pane, in a parallel, spaced apart relationship to the first substrate which second substrate is coated on the side facing the first substrate with a TS layer and on the side facing away from the first substrate with a low emissivity layer. Optionally this low emissivity layer, functions also as a transparent heater if active control of the temperature of the TS layer is desired. This preferred configuration includes a third substrate, as another outside pane, in a parallel, spaced apart relationship to the second substrate which third substrate is generally not coated with a heat reflective or low emissivity layer. The substrates may be glass or plastic. This window configuration can be installed in a building structure with either the first or the third substrate exposed to or facing the exterior of the building and could be used to provide a clear view at some times and privacy or obscured view at other times.

In addition to the above preferred configuration many other multipane window configuration are possible. These vary with regard to number of substrates, placement of the TS layer(s), placement of the low emissivity or heat reflective layer(s), the spacing between the substrates, the type gas or lack thereof between the substrates.

Transparent Heaters, Heat Reflective and Low Emissivity Layers

The transparent heater layers, heat reflective layers and low emissivity layers may be used in windows and other devices of the invention. The transparent heater layers, heat reflective layers and low emissivity layers may be thin metal layers, transparent conducting metal oxide layers, multilayer stacks of metal oxide layers to enhance optical properties or multilayer stacks of alternating layers of metals and metal oxides to enhance optical properties. Preferred heat reflective and low emissivity layer on various substrates are TEC™15 and Energy Advantage® Low-E available from Pilkington-Libbey Owens Ford of Toledo, Ohio; LoĒ-178 and LoE$^2$ available from Cardinal Glass of Spring Green, Wis.; Comfort E and Comfort E2 available from AFG Industries, Inc. of Kingsport, Tenn.; Sungate®100, Sungate®500 and Sungate®1000 available from PPG Industries, Inc. of Pittsburgh, Pa. and Altair™ and Heat Mirror™ layers on polyester films available from Southwall Technologies of Palo Alto, Calif.

EXAMPLES

The following non-limiting example will help illustrate the invention further.

Some of the materials used in examples are listed below.

poly(1,3-propylene glutarate), av. Mw ca. 7,100, av. Mn ca. 5,500, available from Aldrich Chemical Company Inc. of Milwaukee, Wis.

poly(1,3-propylene succinate), av. Mw ca. 9,500, available from Aldrich Chemical Company Inc. of Milwaukee, Wis.

poly(ethylene azelate), av. Mw ca. 55,000, available from Aldrich Chemical Company Inc. of Milwaukee, Wis.

poly(ethylene succinate) available from Aldrich Chemical Company Inc. of Milwaukee, Wis.

PEG-1,500=poly(ethylene glycol) av $M_n$ 1,500 available from Aldrich Chemical Company Inc. of Milwaukee, Wis.

PEG-3,400=poly(ethylene glycol) av $M_n$ 3,400 available from Aldrich Chemical Company Inc. of Milwaukee, Wis.

PEG-8,000=poly(ethylene glycol) av $M_n$ 8,000 available from Aldrich Chemical Company Inc. of Milwaukee, Wis.

PEG-me-550=poly(ethylene glycol) methyl ether av $M_n$ ca. 550 available from Aldrich Chemical Company Inc. of Milwaukee, Wis.

PEG-me-2,000=poly(ethylene glycol) methyl ether, av $M_n$ ca. 2,000 available from Aldrich Chemical Company Inc. of Milwaukee, Wis.

PEG-dme-1,000=poly(ethylene glycol) dimethyl ether, av $M_n$ ca. 1,000 available from Aldrich Chemical Company Inc. of Milwaukee, Wis.

PEA-10,000=poly(ethylene adipate), av. $M_n$ ca. 10,000, available from Aldrich Chemical Company Inc. of Milwaukee, Wis.

PPA-5,700=poly(1,3-propylene adipate), av. $M_n$ ca. 5,700, available from Aldrich Chemical Company Inc. of Milwaukee, Wis.

PBA-12,000=poly(1,4-butylene adipate), av. $M_w$ ca. 12,000, available from Scientific Polymer Products, Inc. of Ontario, N.Y. or Aldrich Chemical Company Inc. of Milwaukee, Wis.

PBA-de-1,000=poly(1,4-butylene adipate), diol end-capped, av. $M_n$ ca. 1,000 available from Aldrich Chemical Company Inc. of Milwaukee, Wis.

PHMC-2,000=poly(1,6-hexamethylene carbonate) diol av. $M_n$ ca. 2,000, available from Aldrich Chemical Company Inc. of Milwaukee, Wis.

PHMA-3,800=poly(1,6-hexamethylene adipate) diol av. $M_n$ ca. 3,800, available from Aldrich Chemical Company Inc. of Milwaukee, Wis.

PCL-2,000=polycaprolactone diol, av. Mn ca. 1,500, available from Aldrich Chemical Company Inc. of Milwaukee, Wis.

PCL-10,000=polycaprolactone, av. Mn ca. 10,000, available from Aldrich Chemical Company Inc. of Milwaukee, Wis.

PCL-triol-300=polycaprolactone triol, av. Mn ca. 300, available from Aldrich Chemical Company Inc. of Milwaukee, Wis.

TERATHANE® CL-2000=polycaprolactone-block-polytetrahydrofuran-block-polycaprolactone av. $M_n$ ca. 2,000, available from Aldrich Chemical Company Inc. of Milwaukee, Wis.

PMMA-15,000=poly(methyl methacrylate) ca. Mw 15,000 available from Scientific Polymer Products, Inc. of Ontario, N.Y.

Desmophen 1100=polyester polyol, equivalent weight 262, available from Bayer Corporation of Pittsburgh Pa.

Desmophen 1800=polyester polyol, equivalent weight 935, available from Bayer Corporation of Pittsburgh Pa.

Desmodur N-3200=hexamethylene diisocyanate based polyisocyanate, equivalent weight 181, available from Bayer Corporation of Pittsburgh Pa.

Desmodur N-100=hexamethylene diisocyanate based polyisocyanate, equivalent weight 191, available from Bayer Corporation of Pittsburgh Pa.

Mondur MRS 4=diphenylmethane-4,4'-diisocyanate, (MDI), based polyisocyanate, equivalent weight 130, available from Bayer Corporation of Pittsburgh Pa.

Mondur MRS 5=diphenylmethane-4,4'-diisocyanate, (MDI), based polyisocyanate, equivalent weight 131, from Bayer Corporation of Pittsburgh Pa.

Dymax 425=UV cure adhesive available from Dymax Corporation of Torrington, Conn.

HOBP=UV absorber/stabilizer, 2-hydroxy-4-(octyloxy) benzophenone available from Aldrich Chemical Company Inc. of Milwaukee, Wis.

3039=UV absorber, Uvinul 3039 available from BASF Corporation of Rensselaer, N.Y.

Tinuvin 144=hindered amine light stabilizer, bis(1,2,2,6,6-pentamethyl-4-piperidinyl) (3,5-di-tertbutyl-4-hydroxybenzyl)butylpropanedioate from Ciba Specialty Chemicals of Tarrytown, N.Y.

Tinuvin 213=polymeric UV absorber/stabilizer, poly (oxy1,2-ethanediyl)-α-[3-[3-(2H-benzotriazol-2-yl)-5-(1,1-dimethylethyl)-4-hydroxyphenyl]-1-oxypropyl]-ω-[3-[3-(2H-benzotriazol-2-yl)-5-(1,1-dimethylethyl)-4-hydroxyphenyl]-1-oxypropyl] and poly(oxy1,2-ethanediyl)-α-[3-[3-(2H-benzotriazol-2-yl)-5 -(1,1-dimethylethyl)-4-hydroxyphenyl]-1-oxypropyl]-ω-hydroxy from Ciba Specialty Chemicals of Tarrytown, N.Y.

BHT=antioxidant, 2,6-di-tert-butyl-4methylphenol

QY=yellow dye, Quinoline Yellow, (Solvent Yellow 33, C.I. 47000) available from Aldrich Chemical Company Inc. of Milwaukee, Wis.

Celestine Blue, (Mordant Blue 14, C.I. 51050), blue dye available from Aldrich Chemical Company Inc. of Milwaukee, Wis.

Quinizarin, (1,4-dihydroxyanthraquinone, C.I. 58050), orange dye available from Aldrich Chemical Company Inc. of Milwaukee, Wis.

Malachite Green Carbinol base, (Solvent Green 1, C.I. 42000:1) green dye available from Aldrich Chemical Company Inc. of Milwaukee, Wis.

BBEA=plasticizer, bis(2-butoxyethyl) adipate, available from Aldrich Chemical Company Inc. of Milwaukee, Wis.

The general procedure for preparing a polyurethane based TS material or layer involves heating a diol and/or a polyol in vacuum, typically at 80C for at least 4 hours to remove dissolved water. A weighed amount of the diol and/or the polyol is mixed with a weighed amount of first polymer, (if the first polymer is a polymer other than that diol or polyol already weighed out), and is heated under vacuum to form a solution and provide further drying. If the first polymer is a portion of the diol and/or polyol already weighed out, the procedure involves going directly to the next step. In the next step, the solution is removed from vacuum and while hot, a diisocyanate or a polyisocyanate and optionally a catalyst are added and thoroughly stirred into the solution. This new solution is heated either in vacuum or at atmospheric pressure or for a short time in vacuum followed by heating at atmospheric pressure. The heating time was about twice the time required for the solution to "set up", meaning that it would no longer flow as a liquid even while hot. The curing temperature is typically 70C to 100C and typical curing times without catalyst are 4 to 20 hours and with catalyst are 0.5 to 4 hours.

Example 1

A solution of 6.0 grams of Desmophen 1800 and 6.0 grams of PBA-12,000 was formed by heating a mixture of the two materials in a vial to 80 C under vacuum for about 2 hours. Mondur MRS 5, 0.84 grams, (to give equal equivalence between the isocyanate groups of Mondur MRS 5 and the hydroxy groups of Desmophen 1800), was thoroughly stirred into the solution and this new solution was placed back in the 80C vacuum oven and vacuum was applied for 5 minutes. Some of this solution was then allowed to cure in the vial at 70C at atmospheric pressure overnight. The cured material was TS in that it was clear, (no visually observable light scattering), at temperatures above 55C and was highly light scattering when held at temperatures below 45C and the material cycled between the clear and light scattering modes every time the temperature was cycled. Similar light scattering materials were formed when the reaction of the Desmophen 1800 and the Mondur MRS5 was accelerated by a drop of Desmorapid PP or a drop of dibutyltin dilaurate.

Example 2

A TS material was prepared by the method described in Example 1 but with 6.0 grams of Desmophen 1800, 6.0 grams of PBA-12,000 and 0.63 grams of Mondur MRS 5. The stoichiometry between the hydroxy groups of the Desmophen 1800 and the isocyanate groups of the Mondur MRS 5 was 1.33 to 1. Having less than equivalent stoichiometry gave rise to more light scattering when the TS material was in its cool, light scattering mode, while the hot, clear mode was still free from visually observed light scattering. This was readily discerned when portions of the materials from Examples 1 and 2 were each cured between two pieces of glass with a TS material layer thickness of 250 microns and attempts were made to look through the TS layers and observe bright images when the layers were in their cool, light scattering mode. In these attempts, just barely perceptible images could be observed with the layer of material from Example 1, while with the material from Example 2, no perceptible images could be observed. This comparison was for images at a distance of greater than 1 inch from the TS layer as placing these light scattering layers very close to or in contact with an image, like a printed page, makes it very difficult to obscure the close up images with the light scattering layers of these two examples.

Example 3

A TS material was prepared by adding 0.22 grams of Desmodur N-3200 to 1.0 gram of vacuum dried, liquid PBA-de-1,000 and allowing the materials to react at 80C for about 15 hours. Some of the material was allowed to react in a vial and some of the material was allowed to react in a 250 micron thick layer between a microscope slide and the transparent conductor coated side of a piece of TEC™ 15 glass. The material cured and set up to a completely colorless, light scattering free condition. On cooling to room temperature the material turned white and highly light scattering. The coated side of the TEC™ 15 glass was provided with electrical contacts on two edges of the glass and was connected to a variable voltage power supply. When the voltage applied was enough to cause the glass and the TS layer to be heated above about 50C the layer turned completely clear and upon cooling to room temperature for at least 15 minutes the layer turned highly light scattering. The switching between the clear and the frosted mode of the layer was repeated hundreds of times with no change in the performance of the TS device.

Comparative Example 1

A sample of 0.5 grams of PBA-12,000 was heated at 80C under vacuum in a mortar to remove water from the material. The material was cooled to room temperature under vacuum, removed from vacuum and ground to a fine powder in the mortar with a pestle. The powder was stirred into 2.0 grams of vacuum dried Desmophen 1100, 1.4 grams of Desmodur N-3200 and a drop of Desmorapid PP and the whole combination of materials was thoroughly mixed. The sample was placed under vacuum at room temperature for 1 hour. This was followed by keeping the sample at atmospheric temperature at about 30C for 24 hours. The cured sample was light scattering based on the white PBA-12,000 powder dispersed in the clear polyurethane matrix. On heating to above the melting point of the PBA-12,000 the material turned less light scattering, but not completely clear and there still appeared to be a significant amount of weak scattering presumably due to the difference in index of refraction between the liquid PBA-12,000 and the polyurethane matrix formed by the Desmophen 1100 and the Desmodur N-3200. On cooling the sample again showed significant scattering due to the solidified dispersed PBA-12,000 particles.

Example 4

A mixture of 8 grams of PBA-12,000 and 8 grams of Desmophen 1800 was heated under vacuum to form a solution and remove some residual water. The solution was removed from the vacuum oven and 0.84 grams of Mondur MRS 5 was added and thoroughly mixed. The stoichiometry between the hydroxy groups of the Desmophen 1800 and the isocyanate groups of the Mondur MRS 5 was 1.33 to 1. The solution was placed back in the vacuum oven and the oven was evacuated. After 10 minutes with the oven at 80C the oven was brought back to atmospheric pressure and the solution was poured onto a sheet of polyester film coated with a transparent conductive layer of ITO. The solution was poured onto the side of the film opposite the ITO coating and the solution was formed into a layer about 250 microns thick on top of the polyester film with a draw down bar. Glass spacer beads, 250 microns in diameter, were sprinkled in the solution layer and a sheet of uncoated polyester film was placed on the solution layer. The layers of polyester, with the solution layer in between them, were placed between two sheets of glass and the whole assembly was placed in a regular oven at 70C to cure the polyisocyanate/polyester polyol/PBA-12,000 solution into a polyurethane/PBA-12,000 TS layer. When the assembly was removed from the oven and the glass sheets were removed, a thin plastic window was obtained that was colorless and clear, (i.e. free from haze or light scattering). On cooling the polyurethane/PBA-12,000 layer turned light scattering and completely obscured any images in an attempt to view them through the window.

Silver epoxy was used to electrically connect copper metal strips to the ITO along opposite sides of the polyester film. The resistance between the copper strip/silver epoxy contacts through the ITO coating was 46 ohms. When 46 volts AC was applied across the contacts the window changed from hazy to clear in 15 seconds. A voltage of 19 volts AC was sufficient to maintain the window in its clear state. The power required for clearing in 15 seconds was 46 watts and the power required for maintaining the clear state was 7.8 watts. The power requirement for clearing in 15 seconds was significantly less than that for the variable light scattering window in example 5.

Example 5

A TS window of the same size as the window of Example 4 was prepared with the same type and thickness of TS layer except it was between a piece of TEC™ 15 glass and piece of plain soda-lime glass instead of between pieces of polyester. Each piece of glass was 2.3 millimeters thick. Power was applied to the tin oxide coating on the TEC™ 15 glass through conductive contact strips. Clearing took place within 15 seconds with an applied voltage of 68 volts and a power supplied to the window of 520 watts. An applied voltage of 10 volts, which corresponded to supplying 11 watts of power, was required to maintain the window in the clear state.

Example 6

TS films were prepared according to the general procedure for urethane based TS materials with the mixtures shown in the following table. The % Polyurethane is the percent by weight of the final material that constitutes the second polymer and is made up essentially by the reaction of Desmophen 1800 and Mondur MRS 5 to form a three dimensional polymer network in which the PBA-12,000 is interspersed. Although the PBA-12,000 may have some terminal hydroxy groups, the equivalent weight is so high that any reaction between the isocyanate groups and the PBA-12,000 is deemed inconsequential.

|  | PBA-12,000 | Desmophen 1800 | Mondur MRS 5 | % Polyurethane |
|---|---|---|---|---|
| Sample 6A | 0.4 g | 1.40 g | 0.20 g | 80% |
| Sample 6B | 0.5 g | 0.66 g | 0.09 g | 60% |
| Sample 6C | 1.0 g | 0.58 g | 0.08 g | 40% |
| Sample 6D | 1.0 g | 0.22 g | 0.03 g | 20% |

Sample 6A—was slightly yellow and clear when hot and only developed slight haze after several days at room temperature Sample 6B—appeared nearly colorless and switched between a clear state when hot and a moderate light scattering state when cool Sample 6C—appeared nearly colorless and switched between a clear state when hot and highly light scattering state when cool Sample 6D—appeared colorless and switched between a clear state when hot and highly light scattering state when cool, however when hot the polymer was a viscous, free flowing liquid, (i.e. it did not set up)

Example 7

Attempts were made to make TS materials with a variety of aliphatic polyesters interspersed in a polyurethane matrix. The mixtures attempted had equal amounts of aliphatic polyester and Desmophen 1800 by weight and had a 1 to 1 stoichiometry between the hydroxy groups of Desmophen 1800 and the isocyanate groups of Mondur MRS 5.

| Polymer | Soluble in Desmphen 1800 | Appearance Cold | Appearance Hot |
|---|---|---|---|
| poly(1,3-propylene adipate) | Yes* | Hazy | Clear |
| poly(1,3-propylene glutarate) | Yes | Clear | Clear |
| poly(1,3-propylene succinate) | Yes | Slight Haze | Clear |
| PBA-12,000 | Yes | Hazy | Clear |
| poly(1,6-hexamethylene adipate) | Marginal | Hazy | Clear** |
| poly(ethylene adipate) | Yes | Hazy | Clear |
| poly(ethylene azelate) | Yes | Hazy | Hazy |
| poly(ethylene succinate) | No | — | — |

*Did not set up, even with extended drying of Desmophen 1800 and poly (1,3-propylene adipate)
**Clear but distorted image due presumably to regions of different index of refraction throughout material As can be seen from the table at least somewhat useful TS materials were prepared from poly(1,3-propylene succinate), PBA-12,000, poly(1,6-hexamethylene adipate) and poly(ethylene adipate). In this test, the other aliphatic polyesters were not useful in preparing TS materials in this particular polyurethane matrix due to a variety of reasons.

Example 8

TS materials were prepared from a variety of poly (ethylene glycols) in polyurethane matrix made up at least in part by the reaction product of Desmophen 1800 and Mondur MRS 5. In each sample the amount of the poly(ethylene glycol) was equal to the amount of the Desmophen 1800. The amount of Mondur MRS 5 was such that the ratio of hydroxy, (OH), groups to isocyanate, (NCO), groups given in the table is the ratio between the hydroxy groups from both the Desmophen 1800 and poly(ethylene glycol) material as compared to the isocyanate groups from the Mondur MRS 5.

| Polymer | Ratio OH:NCO | Appearance Cold | Appearance Hot |
|---|---|---|---|
| PEG-1,500 | 1.37:1 | hazy | clear |
| PEG-3,400 | 1.56:1 | hazy | clear |
| PEG-8,000 | 1.23:1 | hazy | clear |
| PBG-me-550 | 1.45:1 | clear | clear |
| PEG-me-2,000 | 1.47:1 | hazy | clear |
| PEG-dme-1,000 | 1:1 | hazy | clear |

The sample made with PEG-me-550 only becomes somewhat hazy after 8 hours at 6C. In the case of PEG-dme-1000, the polyethylene glycol does not contribute any hydroxy groups and this TS material is an example of an independent first polymer interspersed in a second polymer, polyurethane matrix. In the other cases the poly(ethylene glycols) have reactive hydroxy groups which can lead to a portion of the poly(ethylene glycols) becoming part of the second polymer matrix and a portion remaining as the first polymer.

Example 9

TS materials were prepared by melt mixing PBA-de-1,000 and P(E-co-MAA). The indicated relative amounts of the two polymers being mixed were placed in a vial and the vial was heated on a hot plate to at least 150C while the polymers were stirred and mixed with a stir stick. After a melt mix had formed, some of the mixture was spread on a piece of glass on the hot plate, the glass and the polymer materials were sprinkled with 250 micron in diameter glass beads and a second piece of glass was pressed onto the polymer to form a 250 micron thick layer of polymer between the pieces of glass. On cooling the layers between the pieces of glass turned from clear to hazy. Repeated heating and cooling caused the material to cycle between its clear and hazy states.

| Ratio P(E-co-MMA):PBA-de-1,000 | Appearance Cold | Appearance Hot |
|---|---|---|
| 10:1 | slightly hazy | clear |
| 5:1 | slightly hazy | clear |
| 3.3:1 | slightly hazy | clear |

The temperature for changing from hazy to less hazy or clear is somewhat higher for PBA-de-1,000 in the P(E-co-MAA) than for the PBA-de-1,000 in polyurethane systems and some of the change in light scattering takes place at temperatures above the melting point of the PBA-de-1,000. The environment provided for the PBA-de-1,000 by the P(E-co-MAA) may have an effect on the transition temperature or the softening of the P(E-co-MAA) matrix itself at the higher temperature may contribute to complete switching to the clear state.

Example 10

TS materials were prepared by mixing various ratios by weight of PBA-12,000 with Dymax 425 at temperatures above the melting point of the PBA-12,000. Some of each solution was placed on a piece of hot glass and a second piece of hot glass was placed in contact with the hot liquid spaced from the first piece of glass by 250 microns. This formed a 250 micron thick layer of the uncured material between the two pieces of glass. The samples were kept warm and were placed under a lamp with low intensity UV output for 20 minutes at which time the material layers between the glass pieces were set up to a rigid condition. Upon cooling the materials changed from very slightly hazy to more light scattering especially for the sample which contained PBA-12,000 and Dymax 425 in a 3 to 1 ratio.

| PBA-12,000: Dymax 425 | Appearance Cold | Appearance Hot |
|---|---|---|
| 1:3 | slightly hazy* | nearly clear |
| 1:1 | slightly hazy | nearly clear |
| 3:1 | hazy | nearly clear |

*very slightly hazy on setting at room temperature and noticeably more hazy after setting at −14 C. for several hours.

Example 11

The material from Example 1 was removed from the vial and was chopped into particles less than 1 millimeter on a side. Desmophen 1800, 2.0 grams was heated at 80C under vacuum for 1 hour and 0.28 grams of Mondur MRS 5 was added and the mixture was thoroughly stirred. Some of the milky white particles from the chopping operation were dispersed in this solution. The solution with the dispersed particles was cured at 80C under vacuum for about 20 minutes and then at atmospheric pressure for about 160 minutes. When the vial was removed from the oven with the cured material at 80C, the particles could not be seen at all in the clear yellow polyurethane solid. After the material cooled off to room temperature the particles became visible as tiny, milky white chunks suspended in the polyurethane matrix. Repeated heating above 60C and cooling back to room temperature caused the particles to repeatedly disappear from and reappear to visual observation.

Example 12

A procedure similar to that of Examples 1 and 11 was followed for making light scattering particles except for PHMA-3800 was used in place of PBA-12,000. The finely chopped milky white particles were placed in a solution of 3.0 grams Desmophen 1800 and 0.42 grams Mondur MRS 5 which was cured for 4 hours at 80 C under vacuum. The particles were nearly indistinguishable from the clear yellow polyurethane matrix when hot and were clearly distinguishable when the composite mixture was cooled. This process repeated itself whenever the temperature was cycled between the appropriate levels.

Example 13

A TS material was made in the form of TS particles by reaction in a liquid dispersion. Thus, 10 grams of PBA-de-1,000 were dried in vacuum at 90C for 6 hours. It was cooled, broken up into chunks and placed in a round bottom flask with 200 milliliters of decahydronaphthalene that had been dried over anhydrous sodium sulfate. Also added to the flask were 2.2 grams of Desmodur N-3200 and 0.7 grams of poly(1-vinylpyrrolidone)-graft-(1-hexadecene) as a surfactant. The Desmodur N-3200 provided about 60% as many isocyanate groups as there were hydroxy groups in the PBA-de-1,000. The mixture was heated to 80C with rapid stirring by a stainless steel dispersion blade to form a milky emulsion. The reaction was run for 5 hours at 80C and then an additional 1 gram of the surfactant poly(1-vinylpyrrolidone)-graft-(1-hexadecene) was added. After a total of 16 hours at 80C the slurry was cooled with stirring and filtered to collect the bead like particles which were white in appearance. On heating the beads to above 60C, they changed from white to nearly clear and colorless and returned to their white condition on cooling back to room temperature. About 0.5 grams of the above particles were stirred into 1.0 gram of melted PBA-de-1,000 and 0.36 grams of Desmodur N-3200 to give a one to one ratio of isocyanate groups to hydroxy groups. This mixture was heated at 100C for 6 hours to form a clear, colorless, cured material around the particles. The particles also appeared clear and colorless when hot. Upon cooling the particles changed back to their light scattering form while the polyurethane material surrounding the particles remained clear and the light scattering particles once again scattered a significant amount of the light passing through the overall material. The process of changing between a clear material and a light scattering material could be repeated as often as the temperature was cycled back and forth between room temperature and about 60C.

Example 14

TS materials containing Desmophen 1800 and Mondur MRS 5 along with several different aliphatic polyesters and a couple of different additives were prepared according the general procedure for polyurethane based TS materials. In each case, the total amount of aliphatic polyester was equal to the amount of Desmophen 1800 by weight. The polyurethane matrix was made up by the reaction between Desmophen 1800 and Mondur MRS 5 with the amount of Mondur MRS 5 being such that the indicated ratio of hydroxy to isocyanate groups was present in the reaction initially. Portions of each of the TS materials were formed and cured between pieces of glass in 250 micron thick layers. The pieces of glass laminated together with these TS materials were heated at the rate of 2.9 degrees C. per hour and the temperature range over which the TS layer turned to its clear condition was observed and recorded below. The pieces of glass laminated together with these TS materials were cooled at the rate of 3.8 degrees C. per hour and the temperature range over which the TS layer turned at least somewhat frosted was observed and recorded below.

| Additive | Ratio of OH:NCO | PEA-10,000 | PPA-5,700 | PBA-12,000 | clearing temp. C. | frosting temp. C. |
|---|---|---|---|---|---|---|
| none | 1:1 | | | 100% | 46–50 | 39–36 |
| 5% HOBP | 1:1 | | | 100% | 43–46 | 36–30 |
| 5% 3039 | 1:1 | | | 100% | 43–46 | 36–30 |
| 10% HOBP | 1:1 | | | 100% | <43 | 36–30 |
| 10% 3039 | 1:1 | | | 100% | <43 | <30 |
| none | 1.33:1 | | | 100% | 50–54 | 46–43 |
| 5% HOBP | 1.33:1 | | | 100% | 46–50 | 43–40 |
| 5% 3039 | 1.33:1 | | | 100% | 46–50 | 40–36 |
| 10% HOBP | 1.33:1 | | | 100% | 46–50 | 40–36 |
| 10% 3039 | 1.33:1 | | | 100% | 46–50 | 40–36 |
| none | 1:1 | 50% | | 50% | 50–54 | 46–43 |
| none | 1.33:1 | 50% | | 50% | 50–54 | 46–43 |
| none | 1.33:1 | 100% | | | 43–46 | 36–30 |
| none | 1.67:1 | 100% | | | 46–50 | 40–36 |
| none | 1:1 | | 50% | 50% | 50–54 | 46–43 |
| none | 1.33:1 | | 50% | 50% | 50–54 | 46–43 |
| none | 1:1 | | 25% | 75% | 50–54 | 42–38 |
| none | 1.33:1 | | 25% | 75% | 50–54 | 40–36 |

Example 15

The power requirements for maintaining the clear state of a TS window were measured for several window configurations. The TS window was prepared by pouring a hot solution of PBA-de-1,000 with half the equivalent weight of Desmodur N-3200 onto the tin oxide coated side of a 12 inch by 12 inch hot piece of TEC™ 15 glass. Glass bead spacers with an approximate diameter of 250 microns were sprinkled into the polymer solution and a hot 12 inch by 11 inch piece of plain soda-lime glass was placed on top of the polymer solution and pressed to cause the polymer solution to flow out to the edges and fill the 250 micron gap between the pieces of glass. The window was placed in an oven at 80C for 6 hours to allow the Desmodur N-3200 to react with the diol endcapped poly(1,4-butylene adipate), (PBA-de-1,000).

After this curing time the polymer system was a clear, colorless, rubbery layer that was set up so that it would no longer flow even while hot. On cooling the layer between the pieces of glass became highly light scattering. Electrical contacts were provided on the conductive tin oxide coating on the TEC™ 15 glass that was not overcoated with polymer. This allowed AC electrical power to be supplied to the tin oxide coating to allow it to serve as a transparent heater. In a vertical orientation, this window was heated with the minimum power required to maintain the window in its clear condition either by itself, as a single pane window, or as the center pane of a triple pane window. In the triple pane configuration, the outside panes were provided by TEC™ 15 glass with the tin oxide heat reflecting coating facing the middle pane or by plain soda-lime glass. The spacing between the panes was provided by a insulating foam board frame around the entire perimeter of the window unit so as to provide a quiescent gas space between the center pane and the outside panes. The minimum power requirements for just maintaining the window in its clear condition are given below.

| First Outside Pane | Second Outside Pane | Power (watts) |
|---|---|---|
| None | None | 65 |
| Plain Glass | Plain Glass | 32 |
| Plain Glass | TEC ™ 15 Glass | 29 |
| TEC ™ 15 Glass | TEC ™ 15 Glass | 23 |

Example 16

Materials were prepared according to the general procedure for polyurethane based TS materials. These materials were based on reacting PBA-de-1,000 with Mondur MRS 5 at various ratios based on their hydroxy and isocyanate contents. As shown below, at the lower ratios TS materials were not formed because the material remained clear when cold. At one intermediate ratio, a useful TS material was formed and at the higher ratios the materials did not set up.

| Ratio OH:NCO | Appearance Cold | Appearance Hot |
|---|---|---|
| 1:1 | clear | clear |
| 1.11:1 | clear | clear |
| 1.25:1 | clear | clear |
| 1.33:1 | clear | clear |
| 1.43:1 | hazy | clear |
| 1.67:1 | hazy | clear* |
| 2:1 | hazy | clear* |

*did not set up

Example 17

TS materials were prepared according to the general procedure for polyurethane type TS materials. These materials were based on reacting PBA-de-1,000 with Desmodur N-3200 at various ratios based on their hydroxy and isocyanate content. As shown below, at the lowest ratio a TS material was not formed. At the intermediate ratios, useful TS materials were formed and at the highest ratio the material did not set up.

| Ratio OH:NCO | Appearance Cold | Appearance Hot |
|---|---|---|
| 1:1 | clear | clear |
| 1.33:1 | very slightly hazy | clear |
| 1.67:1 | hazy | clear |
| 2:1 | hazy | clear |
| 2.27:1 | very hazy | clear |
| 3:1 | very hazy | clear* |

*did not set up

Example 18

TS materials were prepared according to the general procedure for polyurethane type TS materials. These materials were based on reacting PHMA-3800 with Desmodur N-3200 at various ratios based on their hydroxy and isocyanate contents. As shown below, at the lowest ratio a TS material useful TS materials were formed and at the highest ratios the material did not set up.

| Ratio OH:NCO | Appearance Cold | Appearance Hot |
|---|---|---|
| 1:1 | slightly hazy | clear |
| 1.3:1 | hazy | clear |
| 2:1 | hazy | clear |
| 3:1 | very hazy | clear* |
| 4:1 | very hazy | clear* |

*did not set up

Example 19

TS materials were prepared according to the general procedure for polyurethane type TS materials. These materials were based on equal amounts, by weight, of PBA-12,000 and Desmophen 1100 reacted with various amounts of Mondur MRS 5. The relative amounts of Desmophen 1100 and Mondur MRS 5 gave the listed ratios between the hydroxy groups and the isocyanate groups. As shown below, at the lowest ratio a TS material was not formed. At the intermediate ratios useful TS materials were formed. At the highest ratio the material did not set up.

| Ratio OH:NCO | Appearance Cold | Appearance Hot |
|---|---|---|
| 1:1 | clear | clear |
| 2:1 | hazy | clear |
| 3:1 | hazy | clear |
| 4:1 | hazy | clear |
| 10:1 | hazy | clear* |

*did not set up

Example 20

TS materials were prepared according to the general procedure for polyurethane type TS materials. These materials were based on equal amounts, by weight, of PBA-de-1,000 and Desmophen 1800 reacted with various amounts of Mondur MRS 5. The relative amounts of PBA-de-1,000 Desmophen 1800 and Mondur MRS 5 gave the listed ratios between the hydroxy groups and the isocyanate groups. As shown below, at the lower ratios useful TS material were formed. At the higher ratios the material did not set up.

| Ratio OH:NCO | Appearance Cold | Appearance Hot |
|---|---|---|
| 1.33:1 | slightly hazy | clear |
| 1.67:1 | hazy | clear |
| 1.82:1 | hazy | clear* |
| 2:1 | hazy | clear* |

*did not set up

Example 21

TS materials were prepared according to the general procedure for polyurethane type TS materials. These materials were based on equal amounts, by weight, of PBA-12,000 and Desmophen 1800 reacted with various amounts of Desmodur N-3200. The relative amounts of Desmophen 1800 and Desmodur N-3200 gave the listed ratios between the hydroxy groups and the isocyanate groups. As shown below, at the lower ratios useful TS material were formed. At the highest ratio the material did not set up.

| Ratio OH:NCO | Appearance Cold | Appearance Hot |
|---|---|---|
| 1:1 | very slightly hazy | clear |
| 1.33:1 | slightly hazy | clear |
| 2:1 | hazy | clear |
| 3:1 | hazy | clear* |

*did not set up

Example 22

TS materials were prepared according to the general procedure for polyurethane type TS materials. These materials were based on equal amounts, by weight, of PBA-12,000 and Desmophen 1100 reacted with various amounts of Desmodur N-3200. The relative amounts of Desmophen 1100 and Desmodur N-3200 gave the listed ratios between the hydroxy groups and the isocyanate groups. As shown below, at the lowest ratio a TS material was not formed. At the intermediate ratios useful TS materials were formed. At the highest ratio the material did not set up.

| Ratio OH:NCO | Appearance Cold | Appearance Hot |
|---|---|---|
| 1:1 | clear | clear |
| 2:1 | very slightly hazy | clear |
| 3:1 | hazy | clear |
| 4:1 | hazy | clear |
| 10:1 | hazy | clear* |

*did not set up

Example 23

TS materials were prepared according to the general procedure for polyurethane type TS materials. These materials were based on equal amounts, by weight, of PBA-de-1,000 and Desmophen 1800 reacted with various amounts of Desmodur N-3200. The relative amounts of PBA-de-1,000, Desmophen 1800 and Desmodur N-3200 gave the listed ratios between the hydroxy groups and the isocyanate groups. As shown below, at the lowest ratio a TS material was not formed. At the intermediate ratio a useful TS material was formed. At the highest ratio the material did not set up.

| Ratio OH:NCO | Appearance Cold | Appearance Hot |
|---|---|---|
| 1.33:1 | clear | clear |
| 2:1 | hazy | clear |
| 4.35:1 | hazy | clear* |

*did not set up

Example 24

TS materials were prepared according to the general procedure for polyurethane type TS materials. These materials were based on equal amounts, by weight, of PBA-de-1,000 and PHMA-3,800. These were reacted with various amounts of Desmodur N-3200. The relative amounts of PBA-de-1,000, PHMA-3,800 and Desmodur N-3200 gave the listed ratios between the hydroxy groups and the isocyanate groups. As shown below, at the lowest ratio a useful TS material was formed. At the highest ratio the material did not set up.

| Ratio OH:NCO | Appearance Cold | Appearance Hot |
|---|---|---|
| 2:1 | hazy | clear |
| 2.63:1 | hazy | clear* |

*did not set up

Example 25

TS materials were prepared according to the general procedure for polyurethane type TS materials. These materials were based on equal amounts, by weight, of PBA-de-1,000 and Desmophen 1100. These were reacted with various amounts of Desmodur N-3200. The relative amounts of PBA-de-1,000, Desmophen 1100 and Desmodur N-3200 gave the listed ratios between the hydroxy groups and the isocyanate groups. As shown below, at the lowest ratio a useful TS material was formed. At the highest ratio the material did not set up.

| Ratio OH:NCO | Appearance Cold | Appearance Hot |
|---|---|---|
| 4:1 | hazy | clear |
| 10:1 | hazy | clear* |

*did not set up

Example 26

The temperatures at which various TS materials changed from light scattering to non-light scattering was measured for 250 micron thick TS layers between pieces of glass. The samples were heated at a rate of about 3.2 degrees C. per hour and their clearing was determined by periodically observation of the samples. After heating all of the samples to their clear condition, they were cooled at the rate of about 6.3 degrees C. per hour and they were periodically observed to determine the temperature at which they changed form non-light scattering to light scattering. The results are shown below.

cal properties of the TS material. The QY was added to provide a yellow light scattering and a yellow tinted clear state to the TS material. The BHT was added to improve the stability of the TS material when it was hot in the presence of oxygen. The Tinuvin 144 was added to improve the sunlight durability of the TS material. The Tinuvin 213 was added to improve the sunlight durability and UV absorption properties of the TS material.

| Additive | Cleared T heat rate 3.2 C/hr | Frosted T cool rate 6.3 C/hr | ΔT |
|---|---|---|---|
| none | 54.0 | 36.0 | 18.0 |
| 10 wt. % BBEA | 51.9 | 38.0 | 13.9 |
| 0.5 wt. % QY | 51.9 | 35.1 | 16.8 |
| 10 wt. % BHT | 52.8 | 33.1 | 19.7 |
| 10 wt. % Tinuvin 213 | 54.0 | 36.0 | 18.0 |
| 5 wt. % Tinuvin 144 | 54.0 | 38.0 | 16.0 |
| 10 wt. % Tinuvin 144 | 56.0 | 36.0 | 20.0 |

| OH material(s) | NCO material | Ratio of OH:NCO | Cleared Temp. heating rate 3.2 C/hr | Frosted Temp. cooling rate 6.3 C/hr | ΔT |
|---|---|---|---|---|---|
| PBA-de-1,000 | MRS 5 | 1.33:1 | 33.9 | 22.4 | 11.5 |
| PBA-de-1,000 | MRS 5 | 1.67:1 | 41.9 | 23.5 | 18.4 |
| Desmophen 1800 | | | | | |
| PBA-de-1,000 | MRS 5 | 1.67:1 | 42.6 | 22.4 | 20.2 |
| PBA-de-1,000 | N-3200 | 2:1 | 46.1 | 27.5 | 18.6 |
| Desmophen 1800 | | | | | |
| PBA-de-1,000 | N-3200 | 4:1 | 47.8 | 26.4 | 21.4 |
| Desmophen 1100 | | | | | |
| PBA-de-1,000 | N-3200 | 2:1 | 49.2 | 29.8 | 19.4 |
| PBA-12,000 | MRS 5 | 3:1 | 50.7 | 31.1 | 19.6 |
| Desmophen 1100 | | | | | |
| PBA-12,000 | MRS 5 | 1:1 | 50.7 | 29.8 | 20.9 |
| Desmophen 1800 | | | | | |
| PHMA-3,800 | N-3200 | 1:1 | 51.9 | 31.8 | 20.1 |
| PBA-12,000/PEG-me-2,000/Desmophen 1800 | MRS 5 | 1.64:1 | 52.8 | 30.0 | 22.8 |
| PBA-12,000 | N-3200 | 4:1 | 54.0 | 38.0 | 16.0 |
| Desmophen 1100 | | | | | |
| PBA-12,000 | MRS 5 | 1.33:1 | 54.0 | 36.0 | 18.0 |
| Desmophen 1800 | | | | | |
| PBA-12,000 | N-3200 | 2:1 | 58.1 | 36.0 | 22.1 |
| Desmophen 1800 | | | | | |
| PBA-de-1,000 | N-3200 | 2:1 | 58.1 | 39.3 | 18.8 |
| PHMA-3,800 | | | | | |
| PHMA-3,800 | N-3200 | 2:1 | 60.0 | 41.4 | 18.6 |
| PHMA-3,800 | N-3200 | 1.33:1 | 60.0 | 39.3 | 20.7 |

Example 27

TS materials were formed by reacting a mixture of equal amounts by weight of PBA-12,000 and Desmophen 1800 with an amount of Mondur MRS 5 sufficient to provide 3 isocyanate groups for every 4 hydroxy groups present in the Desmophen 1800. These TS materials also contained the indicated weight percentages of the indicated additives. These additives did not interfere with the reversible light scattering and clearing performance of the materials. There was a modest impact on the clearing temperature and the frosting temperature as shown in the table below. The BBEA plasticizer was added with the intention of changing the temperature of clearing and frosting and possibly the physi-

Example 28

TS materials were prepared according to the general procedure for polyurethane type TS materials. These materials were based on PBA-12,000 and the diol or hydroxy terminated polymers listed in the table below reacted with various amounts of Desmodur N-3200. The relative amounts by weight of PBA-12,000 and diol polymer are given in the column labeled "Ratio of PBA-12,000 to diol". The amount of added Desmodur N-3200 gave the listed ratios between the hydroxy groups and the isocyanate groups. As shown below, most of the formulations gave rise to useful TS materials. Several of the formulation did not set up. The sample with 2:1 ratio of PBA-12,000 to PHMA-3,800 and a 1:1.67 ratio of OH to NCO was remarkably white in appearance.

| Diol Polymer | Ratio of PBA-12,000 to diol | Ratio OH:NCO | Appearance Cold | Appearance Hot |
|---|---|---|---|---|
| Terathane CL-2000 | 1:1 | 1:1 | Hazy | Clear |
| Terathane CL-2000 | 1:1 | 1.67:1 | Hazy | Clear |
| PBA-de-1,000 | 1:1 | 1:1 | Hazy | Clear |
| PBA-de-1,000 | 1:1 | 1.67:1 | Hazy | Clear |
| PHMC-2,000 | 1:1 | 1:1 | Hazy | Clear |
| PHMC-2,000 | 1:1 | 1.67:1 | Hazy | Clear* |
| PHMA-3,800 | 2:1 | 1:1.67 | Hazy | Clear |
| PHMA-3,800 | 1:1 | 1:1 | Hazy | Clear |
| PHMA-3,800 | 3:1 | 1:1 | Hazy | Clear |
| PHMA-3,800 | 1:1 | 1.67:1 | Hazy | Clear* |
| PHMA-3,800 | 1:2 | 2:1 | Hazy | Clear* |

OH = hydroxy and NCO = isocyanate
* did not set up

Example 29

TS materials were prepared according to the general procedure for polyurethane type TS materials. These materials were based on the reaction of Desmodur N-3200 or Desmodur N-100 with PHMC-2,000 with the indicated ratio of hydroxy groups to isocyanate groups. That a TS material is formed with 1:1 cures may mean that the Desmodur N-3200 and the Desmodur N-100 have higher than reported equivalent weights or may have lost isocyanate groups due to water absorption from the atmosphere or by reaction with residual water in the PHMC-2,000 and thus not all of the hydroxy groups from the PHMC-2,000 are tied up in polymer matrix formation. At other ratios some useful TS materials are formed, although they turn hazy slowly or only turn hazy at low temperatures.

| Desmodur Polyisocyanate | Ratio OH:NCO | Appearance Cold | Appearance Hot |
|---|---|---|---|
| N-3200 | 1:1 | edges slightly hazy at −14 C | clear |
| N-3200 | 1.11:1 | edges slightly hazy at −14 C | clear |
| N-3200 | 1.25:1 | hazy after 2 days at R.T. | clear |
| N-3200 | 1.43:1 | hazy | clear |
| N-3200 | 2:1 | hazy | clear |
| N-3200 | 2.5:1 | hazy | clear* |
| N-100 | 1:1 | edges slightly hazy at −14 C | clear |
| N-100 | 1.11:1 | turns hazy at 6 C | clear |
| N-100 | 1.25:1 | turns hazy at 6 C | clear |
| N-100 | 1.43:1 | hazy after 2 days at R.T. | clear |
| N-100 | 1.67:1 | hazy | clear |
| N-100 | 1.82:1 | hazy | clear |
| N-100 | 2.5:1 | hazy | clear* |

R.T. = room temperature
*did not set up

Example 30

TS materials were prepared according to the general procedure for polyurethane type TS materials. These materials contained various polycaprolactones. Equal amounts, by weight, of PCL-10,000 and PBA-de-1,000 and were used in the first sample and the PBA-de-1,000 was reacted with Desmodur N-3200 to form a useful TS material. The second sample was TS based on partial reaction of the PCL-diol-2,000 With Desmodur N-3200. Equal amounts, by weight, of PBA-12,000 and PCL-triol-300 were used in the last six samples. The PCL-triol-300 was reacted with the indicated polyisocyanate with the indicated ratio of hydroxy groups to isocyanate groups. A useful TS material was formed only in the last sample.

| 1st Polymer | 2nd Polymer | Ratio OH:NCO | Appearance Cold | Appearance Hot |
|---|---|---|---|---|
| PCL-10,000 | PBA-de-1,000: Desmodur N-3200 | 1:1 | Hazy | Clear |
| PCL-diol-2,000 | PCL-diol-2,000: Desmodur N-3200 | 2:1 | Hazy | Clear |
| PBA-12,000 | PCL-triol-300: Desmodur N-3200 | 1:1 | Hazy | Hazy |
| PBA-12,000 | PCL-triol-300: Desmodur N-3200 | 2:1 | Hazy | Hazy |
| PBA-12,000 | PCL-triol-300: Diisocyanatohexane | 1:1 | Hazy | Hazy |
| PBA-12,000 | PCL-triol-300: Desmodur N-100 | 1:1 | Hazy | Hazy |
| PBA-12,000 | PCL-triol-300: Mondur MRS 5 | 1:1 | Clear | Clear |
| PBA-12,000 | PCL-triol-300: Mondur MRS 5 | 2:1 | Hazy | Clear |

Example 31

A small jar containing 20 grams of PBE-de was placed in an oven at 80C under vacuum for several hours. The jar was removed from vacuum and 3.62 grams of Desmodur N-3200 was stirred into the PBA-de-1,000. This solution was heated at 80C under vacuum for 30 minutes. The jar was removed from vacuum again and the material was poured onto a 6 inch by 8 inch piece of TEC™ 15 glass which had 500 micron thick monofilament strips along all four of the sides and near the edges of the glass to prevent material overflow. The polymer coated glass was placed in an oven with one edge of the glass a little higher than the other edge of the glass so that the polymer layer flowed slightly to give a variation in thickness from on side to the other. The sample was cured in the oven at 80C at atmospheric pressure for about 4 hours, at which time the polymer was set up. When the sample was allowed to cool the TS layer turned very hazy. When the sample was uniformly heated by passing electrical current through the tin oxide coating on the TEC™ 15 glass the TS layer cleared first along the edge where the layer was thinnest and the clearing swept across the sample to the thickest side with a smooth shutter action. By varying the length of time for which power was supplied to the sample, a variable amount of the area of the TS layer was cleared. Thus this sample provided a window which could be controlled to give complete privacy, complete clarity or any portion of clearing desired.

Example 32

TS materials were prepared according to the general procedure for polyurethane type TS materials. These materials contained various ratios of TERATHANE® CL 2,000 and Desmodur N-3200 to give the listed ratios of hydroxy groups to isocyanate groups. All the samples formed useful TS materials that are particularly attractive for low temperature applications like warnings displays of ice or freezing conditions. The table shows the variation in temperature for the formation of the light scattering state as a function of the relative amounts of first polymer to second polymer. That a TS material is formed with a 1:1 cure may mean that the Desmodur N-3200 may have a higher than reported equivalent weight or may have lost isocyanate groups due to water absorption from the atmosphere or residual water in the TERATHANE® CL 2,000 and thus not all of the hydroxy groups from the TERATHANE® CL 2,000 are tied up in polymer matrix formation.

| Ratio of OH:NCO | Frosted at 21 C. | Frosted at 6 C. | Frosted at −14 C. |
| --- | --- | --- | --- |
| 1:1 | No | No | Slight |
| 1.05:1 | No | No | Slight |
| 1.25:1 | No | Slight | Yes |
| 1.43:1 | No | Yes | Yes |
| 2:1 | No | Yes | Yes |

Example 33

TS materials were prepared according to the general procedure for polyurethane type TS materials. These materials contained various ratios of PHMC-2,000 and Desmodur N-3200 to give the listed ratios of hydroxy groups to isocyanate groups. All the samples formed useful TS materials. The table shows the variation in temperature for the formation of the light scattering state as a function relative amounts of first polymer to second polymer. That a TS material is formed with a 1:1 cure may mean that the Desmodur N-3200 actually has a higher than reported equivalent weight or has lost isocyanate groups due to water absorption from the atmosphere and thus not all of the hydroxy groups from the PHMC-2,000 are tied up in polymer matrix formation.

| Ratio of OH:NCO | Frosted at 21 C. | Frosted at 6 C. | Frosted at −14 C. |
| --- | --- | --- | --- |
| 1:1 | No | No | Slight on edges |
| 1.11:1 | No | No | Slight |
| 1.25:1 | No | Yes | Yes |
| 1.43:1 | No | Yes | Yes |
| 2:1 | No | Yes | Yes |

Example 34

A sample of 2.0 grams of vacuum dried PBA-de-1,000 was thoroughly mixed with 0.44 grams of Desmodur N-3200. Several large drops of this material were placed on the coated side of a piece of glass coated with a layer of chromium metal and a layer of rhodium metal. The glass coated with the two metal layers was a mirror with high specular reflectance. After placing the TS material precursors on the rhodium surface, a clear piece of glass was placed over the precursor material and was used to press it out to a 500 micron thick layer with the help of monofilament spacers. The TS layer was formed by reacting the precursors between the pieces of glass at 80C for about 6 hours. After curing the TS layer was set up and clear and there was high specular reflectance in the area of the layer. On cooling the layer turned light scattering and the high specular reflectance in the area of the layer was gone. The contrast between the area coated with the TS layer and the area not coated was excellent. Electrical contacts were provided on either side of the metal coated glass on the metal coatings and electric current was passed through the metals to resistively heat the TS layer. As the TS material was heated through its transition from scattering to clear a dramatic increase in specular reflection and a dramatic decrease in contrast took place. The device could be cycled essentially indefinitely between the high specular reflectance and low specular reflectance states.

Example 35

A TS layer was formed by reacting a mixture of equal amounts by weight of PBA-12,000 and Desmophen 1800 with an amount of Mondur MRS 5 sufficient to provide 3 isocyanate groups for every 4 hydroxy groups present in the Desmophen 1800. The TS layer was formed over the entire surface area and between two pieces of glass that made up the window-door of a toaster oven. When the toaster oven was cool the TS layer was light scattering and totally obscured the view of the inside of the oven. When the oven was turned on and heated up, the window heated up and spontaneously changed to non-light scattering. In the non-light scattering condition the window-door was like a clear piece of glass revealing a complete view of the inside of the oven. When the window-door was cold and light scattering it had 93% haze and 86% total transmission, (both direct and diffuse), for light of Illuminant A and when the window-door was hot and in its clear condition it had 2.2% haze and 90.8% transmission for light of Illuminant A. The haze was measured with a Hazegard haze meter available from BYK-Gardner, Inc. of Silver Springs, Md.

Example 36

A TS material was prepared according the general procedure for polyurethane type TS materials. The material was formed by reacting 44% by weight PEG-me-550, 44% by weight Desmophen 1800 and 12% by weight MRS-5. This gave a 1:0.7 ratio of hydroxy groups to isocyanate groups. The cured and set up material only became some what light scattering even after prolonged periods of time at 6C. The material became uniformly frosted and significantly light scattering at −14C.

Example 37

TS materials were made with PBA-de-1,000 and Desmodur N-3200 with the indicated ratios of hydroxy to isocyanate groups and the indicated fumed silica content. All of the samples were heated a 80C for 10 minutes and then were observed at room temperature to determine the time required for the materials to change to the hazy, light scattering condition. The times are given in the table below. At lower fumed silica contents, the presence of fumed silica increased the time required to achieve the hazy, light scattering condition. At higher fumed silica contents, the presence of fumed silica has a dramatic effect on decreasing the time required to achieve the hazy, light scattering condition.

| Ratio of OH:NCO | Fumed Silica | Appearance Cold | Appearance Hot | Time (minutes) |
| --- | --- | --- | --- | --- |
| 2:1 | 0.4% TS720 | Hazy | Clear | 25 |
| 2:1 | 0.8% TS720 | Hazy | Clear | 20 |
| 2:1 | 0.8% M5 | Hazy | Clear | 19 |
| 2:1 | 1.7% M5 | Hazy | Clear | 19 |
| 2:1 | 0% | Hazy | Clear | 18 |
| 2:1 | 4.1% M5 | Hazy | Clear | 11 |
| 2:1 | 4.1% M5 | Hazy | Clear | 10 |
| 3.33:1 | 4.3% M5 | Hazy | Clear | 9 |
| 5:1 | 4.5% M5 | Hazy | Clear* | 9 |
| 2:1 | 6.0% M5 | Hazy | Clear* | 9 |

*did not set up

Example 38

A TS was prepared from PBA-de-1,000 and Desmodur N-3200 with a ratio of hydroxy groups of isocyanate groups of 2 to 1. The TS layer was prepared between a sheet of TEC™ 15 glass and a microscope slide with a thickness of about 500 microns. After the TS material was thoroughly cured, the device was placed in a spectrometer and the amount of light that was directly transmitted, (not scattered), was measured as a function of temperature. The temperature of the device was raised above room temperature by passing current through the doped tin oxide on the TEC™ 15 glass. The power was increased after each transmission measurement and was given 8 minutes in each case to reach a new steady state temperature before a new transmission level was measured. The results are shown in the table below. In order to insure that the device could be controlled at intermediate transmission levels, the device was allowed to cool to room temperature and returned to its light scattering condition. The device was then heated to 37C and was maintained at this temperature for 1 hour. The transmission of the device increased to 2.4% and remained constant within 0.3 percentage points for the remainder of the hour. Over a limited range of temperatures the transmission of the device was controllable in a gray scale manner.

| Temperature C. | White Light Transmission |
| --- | --- |
| 22 | 0.6 |
| 25 | 0.6 |
| 29 | 0.7 |
| 34 | 1.0 |
| 37 | 2.6 |
| 39 | 5.6 |
| 42 | 68 |
| 46 | 74 |
| 47 | 74 |

Example 39

A TS layer was formed between a piece of glass and a thermoelectric device, Model No. DT 12-6-015 from Marlow Industries of Dallas Tex. The TS layer was made up of PBA-de-1,000 reacted with Desmodur N-3200 with a ratio of 2 hydroxy groups per isocyanate group and was 1.5 millimeters thick. The thermoelectric device portion of the TS device placed in contact with an aluminum heat sink and the thermoelectric device was connected to a DC power supply with a switch that allowed the polarity of the voltage to the device to be reversed. With one polarity the thermoelectric device provided heat to the TS layer and with the other polarity it removed heat from the TS layer. An image in the form of black lettering was formed on the thermoelectric device prior to coating it with the TS layer. In the light scattering state this lettering was partially obscured and unreadable. In the clear state the lettering was clear and readable. It took 30 seconds for the TS layer to clear after placing the thermoelectric device in the mode for heating and 90 seconds for the TS layer to completely frost the layer after the thermoelectric device was placed in the mode for cooling. This 2 minute cycle time for complete clearing and complete frosting was repeated several times in a row with no change in the transition timing. A similar TS layer that was heated to its clear state took 20 minutes to completely frost up while at room temperature without active cooling.

Example 40

TS scattering materials that were largely made up of first polymer were attempted. These contained PBA-12,000 in a polyurethane matrix made up of Desmophen 1100 and Desmodur N-3200 with an equal ratio of hydroxy groups to isocyanate groups. The weight percentage of the total TS material made up by PBA-12,000 is as indicated in the table. In this example a useful TS material was obtained with 80% of the total material being made up of the first polymer and only 20% being made up of the second polymer.

| Weight % PBA-12,000 | Appearance Cold | Appearance Hot |
| --- | --- | --- |
| 80% | hazy | clear |
| 90% | hazy | clear* |

*did not set up

Example 41

A TS material was prepared by adding an equal weight amount of PMMA-15,000 to liquid PBA-de-1,000 followed by heating and stirring. The two polymers formed a homogenous mixture that was spread on a piece of glass. The polymer mixture and the piece of glass were sprinkled with 250 micron in diameter glass beads and a second piece of glass was pressed on to the polymer to form a 250 micron thick layer of the polymer between the pieces of glass. On cooling, the clear polymer mixture turned light scattering. Repeated heating to temperatures above the melting point of the PBA-de-1,000 caused the TS layer to turn clear and the light scattering condition was reestablished each time the material was cooled to room temperature. The material remained solid for a range of temperatures above the clearing point.

Example 42 Four different TS layers were prepared with PBA-de-1,000 and enough Desmodur N-3200 to provide a ratio of hydroxy groups to isocyanate groups of 2 to 1. One contained 0.5 weight % QY and changed from a yellow, light scattering material to a clear yellow tinted layer on heating to temperatures above the melting point of PBA-de-1,000. The second layer contained 0.5 weight % Celestine Blue and changed from a blue, light scattering material to a clear blue tinted layer on heating to temperatures above the melting point of PBA-de-1,000. The third layer contained 0.5 weight % Quinizarin and changed from a reddish/orange, light scattering material to a clear reddish/orange tinted layer on heating to temperatures above the melting point of PBA-de-1,000. The second layer contained 0.5 weight % Malachite Green Carbinol base and changed from a lime green, light scattering material to a clear lime green tinted layer on heating to temperatures above the melting point of PBA-de-1,000.

Example 43 A wire mesh of the type used in a screen doors was coated with a thermoscattering material that consisted of PBA-de-1,000 and enough Desmodur N-3200 to provide a ratio of hydroxy groups to isocyanate groups of 1.67 to 1. The resistance of the metal screen was quite low and passing a lot of current at a low voltage through the mesh caused the TS material to switch from frosted to clear.

To increase the resistance a 0.005 inch diameter Nichrome 80 wire with a resistance of 26 ohms per foot was strung in a back and forth pattern on a piece of glass. A solution of PBA-de-1,000 and enough Desmodur N-3200 to provide a ratio of hydroxy groups to isocyanate groups of 1.67 to 1 was poured on the glass and 250 micron thick glass bead were sprinkled on the solution. Second piece of glass was pressed onto the solution and to form a uniform 250 micron thick layer with embedded Nichrome 80 wire. A TS layer was formed by heating the assembly at 90C for 8 hours.

When the device cooled it was uniformly light scattering over the area of the window.

When electrical current was passed through the nichrome 80 wire the TS material cleared first near the wire but soon the heat generated in the wire caused the entire layer to clear.

What is claimed is:

1. A thermally reversible light scattering material comprising a first polymer interspersed in a matrix provided by a second polymer, the first polymer upon heating from a temperature below its melting point to a temperature above its melting point changing from a light scattering solid to a liquid.

2. The material of claim 1 wherein said first polymer is an aliphatic polyester, a poly(olefin glycol) and/or a poly(olefin carbonate).

3. The material of claim 1 wherein the matrix of the second polymer is a polyurethane matrix.

4. The material of claim 1 incorporated in a window for a fireplace which obscures the view of the inside of the fireplace when the window is cold and does not obscure the view of the inside of the fireplace when the window is hot.

5. The material of claim 1 incorporated in a shower head or faucet which indicates the temperature of the water flowing therethrough by changing from light scattering when the shower head is cold to less or non-light scattering when the shower head is hot.

6. The material of claim 1 incorporated in a housing for a vehicle headlamp which obscures the view of the inside of the headlamp when the housing is cold and changes to less or non-light scattering when the headlamp is activated to allow light from the headlamp to pass through the housing with little or no scattering of the light.

7. The material of claim 1 incorporated in a coating that indicates the presence of a fire by changing from light scattering when cold to less or non-light scattering when heated by the fire.

8. The material of claim 1 incorporated into a window which is heated using a control circuit which intermittently heats the material in the window to maintain the material continuously in its low or non-light scattering state over long periods of time.

9. The material of claim 1 wherein the material changes from light scattering to less or non-light scattering when heated by microwave energy.

10. The material of claim 1 in association with a layer that provides heat reflection in a manner that reduces the rate of heat loss from the light scattering material.

11. The material of claim 1 in association with a layer that provides low emissivity in a manner that reduces the rate of heat loss from the light scattering material.

12. The material of claim 1 wherein the first polymer is selected from the group consisting of poly(1,6-hexamethylene adipate), poly(1,4-butylene adipate), poly(ethylene adipate), an aliphatic polyester/poly(olefin glycol) copolymer, poly(ethylene glycol), poly(ethylene glycol) methyl ether, poly(ethylene glycol) dimethyl ether, poly(propylene glycol), poly(hexamethylene carbonate)diol and combinations, mixtures and blends thereof.

13. The material of claim 1 wherein the second polymer has a glass transition temperature which is less than the light scattering transition temperatures.

14. The material of claim 12 wherein the second polymer is an acrylic polymer, a urethane polymer or a combination thereof.

15. The material of claim 1 wherein the first polymer is blended with the second polymer.

16. The material of claim 1 wherein the material is prepared by partially reacting said first polymer with less than a stoichiometric amount of a polyfunctional cross linking material.

17. The material of claim 16 wherein the material is formed by partially reacting a polyol with a polyisocyanate.

18. The material of claim 17 wherein the material is formed by partially reacting a poly(alkylene) adipate and a polyisocyanate.

19. The material of claim 1 wherein the first polymer is present in an amount of about 5 to 85% by weight based on the total amount of the first and second polymer.

20. The material of claim 3 wherein the matrix is formed from materials wherein the ratio of hydroxy groups to isocyanato groups is about 1:2 to 5:1.

21. A window that comprises a center pane and two outer panes in parallel spaced relationship to the center pane wherein the center pane is coated with a layer of the material of claim 1.

22. A thermally reversible light scattering material which changes from more light scattering to less light scattering as the temperature of the material increases which material comprises:

(A) a polymer matrix and (B) polymer chains interspersed in the polymer matrix which melt to form a polymeric liquid which is miscible with the polymer matrix as the temperature of the material increases.

23. The material of claim 2 wherein the matrix of the second polymer is a polyurethane matrix.

24. The material of claim 22 wherein said polymer chains are aliphatic polyester chains, poly(olefin glycol) chains, and/or poly(olefin carbonate) chains.

25. The material of claim 22 wherein the matrix is a polyurethane matrix.

26. The material of claim 24 wherein the matrix is a polyurethane matrix.

27. The material of claim 22 in association with a layer that provides heat reflection in a manner that reduces the rate of heat loss from the light scattering material.

28. The material of claim 22 in association with a layer that provides low emissivity in a manner that reduces the rate of heat loss from the light scattering material.

29. The material of claim 22 wherein the polymer chains are selected from the group consisting of poly(1,6-hexamethylene adipate) chains, poly(1,4-butylene adipate) chains, poly(ethylene adipate) chains, aliphatic polyesterlpoly(olefin glycol) copolymer chains, poly(ethylene glycol) chains, poly(ethylene glycol) methyl ether chains, poly(ethylene glycol) dimethyl ether chains, poly(propylene glycol) chains, poly(hexamethylene carbonate) diol chains and combinations, mixtures and blends thereof.

30. The material of claim 22 wherein the matrix has a glass transition temperature which is less than the light scattering transition temperatures.

* * * * *

UNITED STATES PATENT AND TRADEMARK OFFICE
CERTIFICATE OF CORRECTION

PATENT NO.   : 6,362,303 B1
DATED        : March 26, 2002
INVENTOR(S)  : Harlan J. Byker et al.

It is certified that error appears in the above-identified patent and that said Letters Patent is hereby corrected as shown below:

<u>Column 44,</u>
Line 52, the word "polyesterpoly" should be -- polyester/poly --.

Signed and Sealed this

Twenty-eighth Day of May, 2002

Attest:

JAMES E. ROGAN
*Attesting Officer*          *Director of the United States Patent and Trademark Office*